(12) United States Patent
Onsen

(10) Patent No.: US 8,448,191 B2
(45) Date of Patent: May 21, 2013

(54) DEVICE DRIVER INSTALLER AND INSTALLATION METHOD

(75) Inventor: Takahiro Onsen, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/551,811

(22) Filed: Sep. 1, 2009

(65) Prior Publication Data

US 2010/0083284 A1    Apr. 1, 2010

(30) Foreign Application Priority Data

Sep. 30, 2008 (JP) ................................. 2008-255247

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................................ 719/321

(58) Field of Classification Search .................... 719/321
See application file for complete search history.

(56) References Cited

U.S. PATENT DOCUMENTS

| | | | | |
|---|---|---|---|---|
| 6,952,831 B1 * | 10/2005 | Moore | ........................... | 719/327 |
| 7,574,713 B2 * | 8/2009 | Tabares et al. | ................. | 719/321 |
| 7,640,554 B2 * | 12/2009 | Yamade | ........................ | 719/327 |
| 2003/0196007 A1 * | 10/2003 | Baron | .............................. | 710/13 |
| 2004/0223182 A1 | 11/2004 | Minagawa | | |
| 2005/0039193 A1 * | 2/2005 | Choi et al. | ..................... | 719/321 |
| 2005/0168771 A1 * | 8/2005 | Hatano et al. | ................. | 358/1.15 |
| 2005/0225795 A1 * | 10/2005 | Nuggehalli et al. | ......... | 358/1.15 |
| 2006/0147235 A1 * | 7/2006 | Sadovsky et al. | ............... | 400/62 |
| 2008/0140821 A1 * | 6/2008 | Tada | ............................. | 709/223 |

FOREIGN PATENT DOCUMENTS

| | | |
|---|---|---|
| JP | 2004-265061 A | 9/2004 |
| JP | 2005-302031 | 10/2005 |
| JP | 2006-236242 A | 9/2006 |

OTHER PUBLICATIONS

European Search Report dated Nov. 25, 2011 issued in corresponding European Patent Application No. 09169341.6.

* cited by examiner

*Primary Examiner* — Diem Cao
(74) *Attorney, Agent, or Firm* — Fitzpatrick, Cella, Harper & Scinto

(57) ABSTRACT

This invention lightens a burden in development by using a generic device driver and also lightens a burden on a user by automatically performing customization suitable for a model to be installed. A client PC acquires AA from an image forming apparatus as its type ID. A generic device driver to be used is determined by extracting, from the type ID, a series ID determined by the interface. In addition, based on the value of a group ID representing a function group, the generic device driver is reconfigured and installed in accordance with the functions of the image forming apparatus.

9 Claims, 24 Drawing Sheets

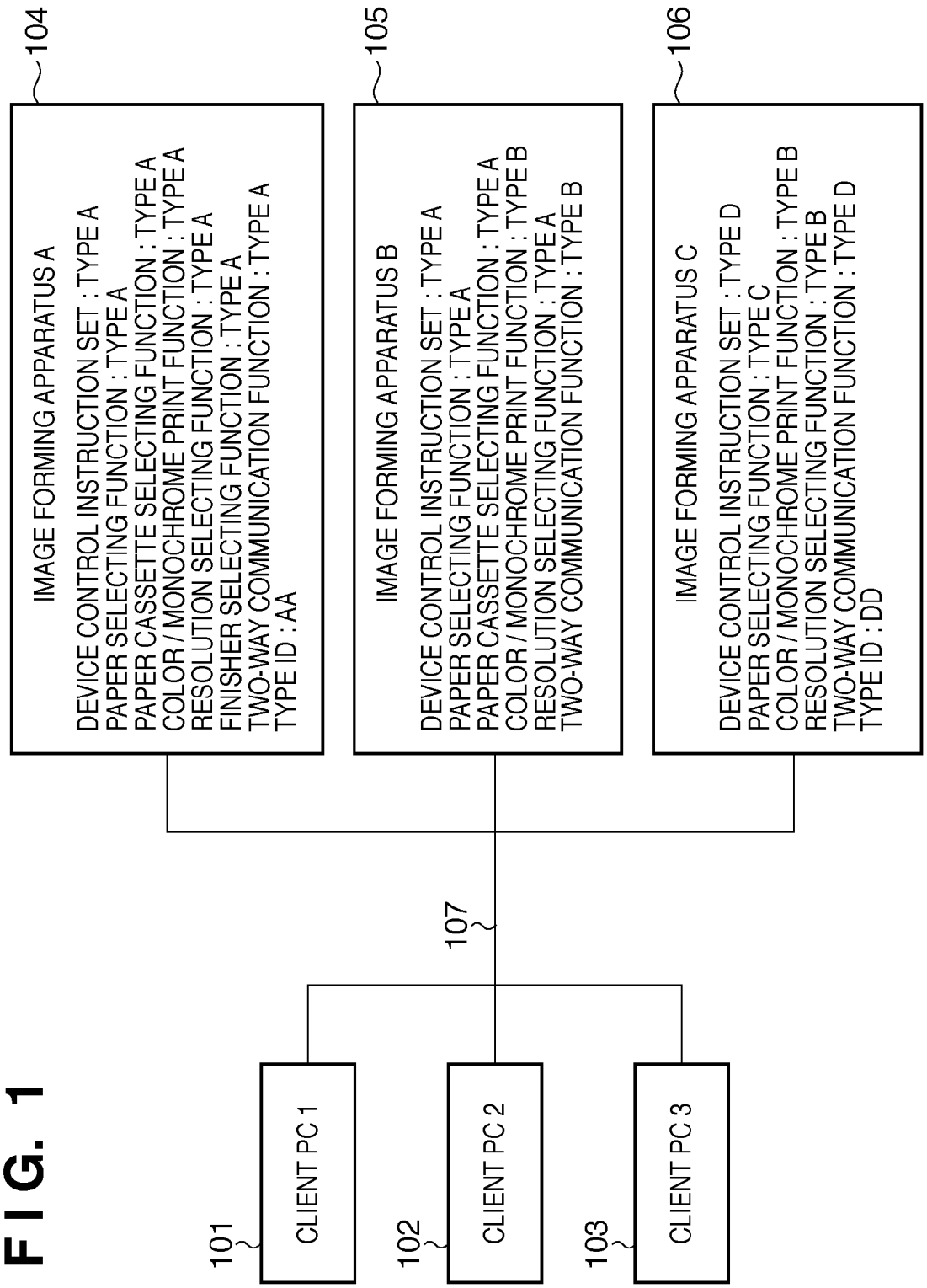

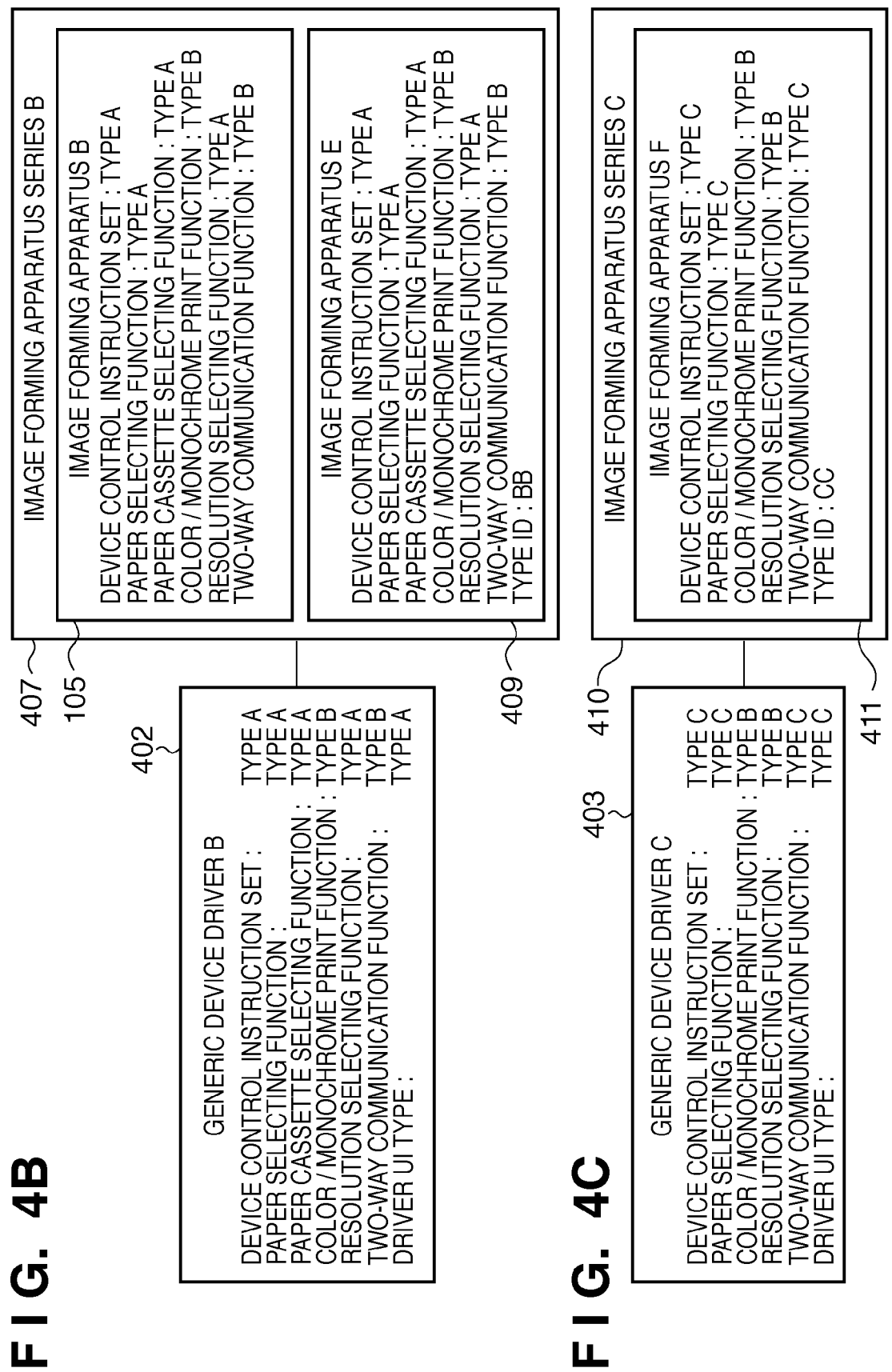

F I G. 6

IMAGE FORMING APPARATUS B : TYPE ID = BB
IMAGE FORMING APPARATUS P : TYPE ID = AA
IMAGE FORMING APPARATUS Q : TYPE ID = AD
IMAGE FORMING APPARATUS R : TYPE ID = CC
IMAGE FORMING APPARATUS S : TYPE ID = BB
IMAGE FORMING APPARATUS T : TYPE ID = AA

FIG. 7A-2

713 — CUSTOMIZATION INFORMATION STORAGE AREA
{
GROUP ID : A
DRIVER UI TYPE : TYPE A
DEVICE CONTROL INSTRUCTION SET : TYPE A
PAPER SELECTING FUNCTION : TYPE A
PAPER CASSETTE SELECTING FUNCTION : TYPE A
COLOR / MONOCHROME PRINT FUNCTION : TYPE A
RESOLUTION SELECTING FUNCTION : TYPE A
FINISHER SELECTING FUNCTION : TYPE A
TWO-WAY COMMUNICATION FUNCTION : TYPE A

GROUP ID : B
DRIVER UI TYPE : TYPE A
DEVICE CONTROL INSTRUCTION SET : TYPE A
PAPER SELECTING FUNCTION : TYPE A
PAPER CASSETTE SELECTING FUNCTION : TYPE A
COLOR / MONOCHROME PRINT FUNCTION : TYPE B
RESOLUTION SELECTING FUNCTION : TYPE A
TWO-WAY COMMUNICATION FUNCTION : TYPE B

GROUP ID : C
DRIVER UI TYPE : TYPE C
DEVICE CONTROL INSTRUCTION SET : TYPE C
PAPER SELECTING FUNCTION : TYPE C
PAPER CASSETTE SELECTING FUNCTION : TYPE B
COLOR / MONOCHROME PRINT FUNCTION : TYPE B
RESOLUTION SELECTING FUNCTION : TYPE B
TWO-WAY COMMUNICATION FUNCTION : TYPE C

GROUP ID : D
DRIVER UI TYPE : TYPE D
DEVICE CONTROL INSTRUCTION SET : TYPE D
PAPER SELECTING FUNCTION : TYPE D
PAPER CASSETTE SELECTING FUNCTION : TYPE B
COLOR / MONOCHROME PRINT FUNCTION : TYPE B
RESOLUTION SELECTING FUNCTION : TYPE B
FINISHER SELECTING FUNCTION : TYPE B
TWO-WAY COMMUNICATION FUNCTION : TYPE A
}

714 — DEVICE INDEPENDENT FUNCTION INFORMATION STORAGE AREA

715 — DRIVER UI TYPE UNIT

716 — TYPE A
TEMPLATE : UI TEMPLATE 1
RESOURCE LANGUAGE : JAPANESE
Bitmap TYPE : A 717 — TYPE B
TEMPLATE : UI TEMPLATE 2
RESOURCE LANGUAGE : JAPANESE
Bitmap TYPE : A 718 — TYPE C
TEMPLATE : UI TEMPLATE 1
RESOURCE LANGUAGE : ENGLISH
Bitmap TYPE : B 719 — TYPE D
TEMPLATE : UI TEMPLATE 2
RESOURCE LANGUAGE : ENGLISH
Bitmap TYPE : B

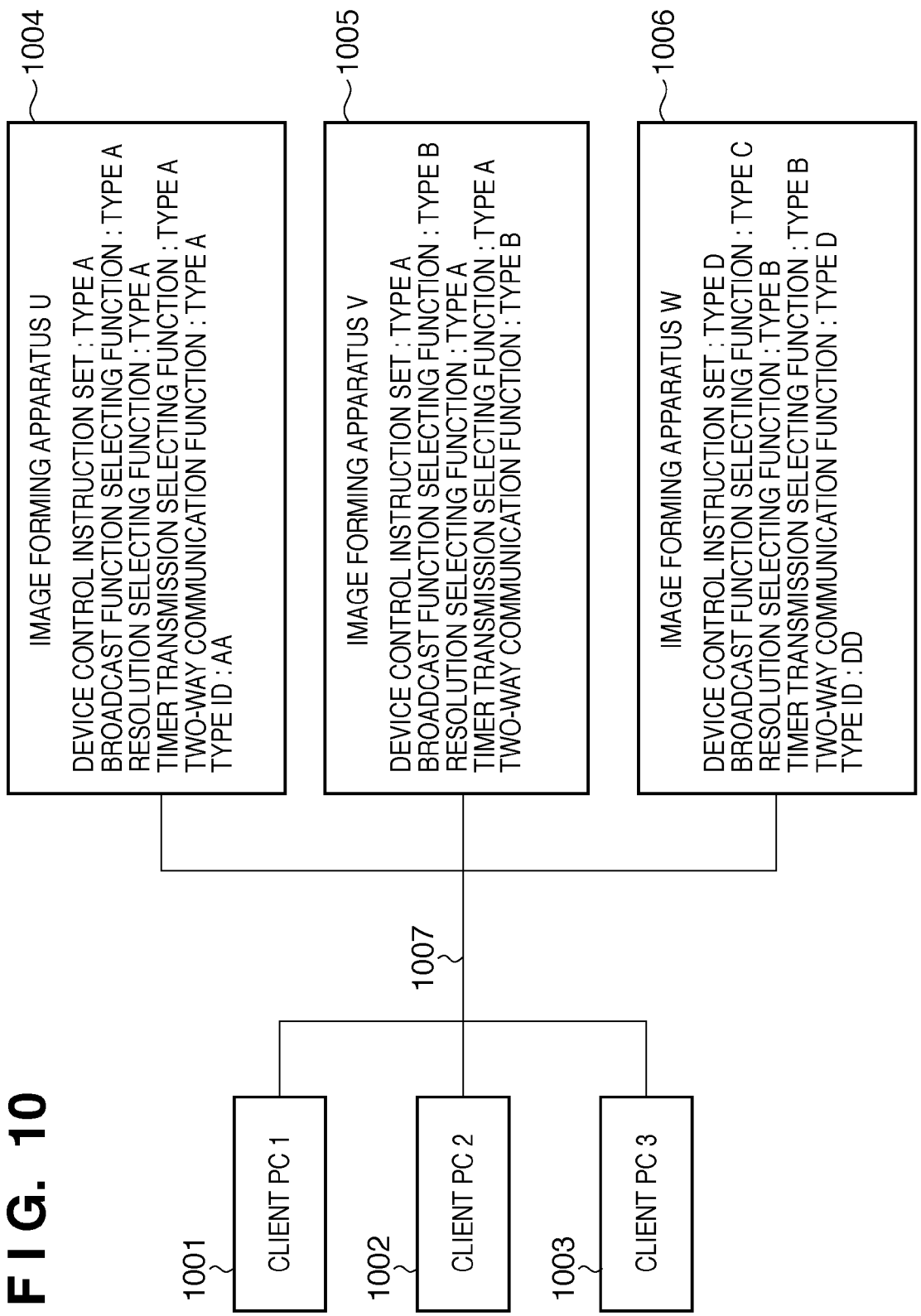

F I G. 13

IMAGE FORMING APPARATUS V : TYPE ID = BB

F I G. 14A-2

1413 — CUSTOMIZATION INFORMATION

GROUP ID : A
DRIVER UI TYPE : TYPE A
DEVICE CONTROL INSTRUCTION SET : TYPE A
BROADCAST FUNCTION SELECTING FUNCTION : TYPE A
RESOLUTION SELECTING FUNCTION : TYPE A
TIMER TRANSMISSION SELECTING FUNCTION : TYPE A
TWO-WAY COMMUNICATION FUNCTION : TYPE A

GROUP ID : B
DRIVER UI TYPE : TYPE A
DEVICE CONTROL INSTRUCTION SET : TYPE A
BROADCAST FUNCTION SELECTING FUNCTION : TYPE B
RESOLUTION SELECTING FUNCTION : TYPE A
TIMER TRANSMISSION SELECTING FUNCTION : TYPE A
TWO-WAY COMMUNICATION FUNCTION : TYPE B

GROUP ID : C
DRIVER UI TYPE : TYPE C
DEVICE CONTROL INSTRUCTION SET : TYPE B
BROADCAST FUNCTION SELECTING FUNCTION : TYPE C
RESOLUTION SELECTING FUNCTION : TYPE B
TIMER TRANSMISSION SELECTING FUNCTION : TYPE C
TWO-WAY COMMUNICATION FUNCTION : TYPE C

GROUP ID : D
DRIVER UI TYPE : TYPE D
DEVICE CONTROL INSTRUCTION SET : TYPE B
BROADCAST FUNCTION SELECTING FUNCTION : TYPE B
RESOLUTION SELECTING FUNCTION : TYPE B
TIMER TRANSMISSION SELECTING FUNCTION : TYPE B
TWO-WAY COMMUNICATION FUNCTION : TYPE A

1414 — DEVICE INDEPENDENT FUNCTION INFORMATION STORAGE AREA

1415 — DRIVER UI TYPE UNIT

1416 — TYPE A
TEMPLATE : UI TEMPLATE 1
RESOURCE LANGUAGE : JAPANESE
Bitmap TYPE : A

1417 — TYPE B
TEMPLATE : UI TEMPLATE 2
RESOURCE LANGUAGE : JAPANESE
Bitmap TYPE : A

1418 — TYPE C
TEMPLATE : UI TEMPLATE 1
RESOURCE LANGUAGE : ENGLISH
Bitmap TYPE : B

1419 — TYPE D
TEMPLATE : UI TEMPLATE 2
RESOURCE LANGUAGE : ENGLISH
Bitmap TYPE : B

DEVICE DRIVER INSTALLER AND INSTALLATION METHOD

BACKGROUND OF THE INVENTION

1. Field of the Invention

The present invention relates to a device driver installer and an installation method which install, in an information processing apparatus, a device driver to control an image processing apparatus.

2. Description of the Related Art

An information processing apparatus such as a computer normally uses a device driver to control an image forming apparatus such as a printer or an MFP (Multi Function Peripheral) and make it execute processing such as printing. A device driver is software having a function of controlling an image forming apparatus and installed in an information processing apparatus as needed. Since image forming apparatuses have different functions depending on their types, device drivers for controlling them need to be developed and provided in accordance with the apparatus types. Developing device drivers and distributing them to users are very burdensome for any manufacturer which develops many kinds of image forming apparatuses.

In general, an operation of installing, updating, and evaluating device drivers is very cumbersome for a user. If the device drivers exist for the respective types of image forming apparatuses, the maintenance of them increases the burden on the user. To lighten the workload on the user side concerning the device drivers, it is effective to provide a generic device driver capable of controlling a plurality of kinds of image forming apparatus having different functions.

The generic device driver has a plurality of control functions corresponding to a plurality of kinds of image forming apparatuses. In addition, the generic device driver is preferably configured to permit customization according to the functions of an image forming apparatus to be controlled.

The generic device driver is also preferably automatically customized for an image forming apparatus as a control target and installed in an information processing apparatus without making the user select the control functions.

How to provide a generic device driver is proposed in, e.g., Japanese Patent Laid-Open No. 2005-302031 (patent reference 1). In the method described in patent reference 1, a generic printer driver extracts configuration data from a printing apparatus, stores it in a nonvolatile storage device, and automatically customizes itself in accordance with the configuration data.

Generally, there is a variety of image forming apparatuses ranging from single-function products to multi-function products. A generic device driver which should control all kinds of image forming apparatuses by itself needs to have all functions provided by them. However, the generic device driver cannot simultaneously have functions with an exclusive relationship.

The generic device driver customizes itself by acquiring function information from an image forming apparatus. However, if the function information transfer amount is limited, the function information cannot completely be transferred, or transfer takes a long time.

If an image forming apparatus to be used is unrecognizable because of, for example, an old model or a new product, and whether it complies with the generic device driver is undeterminable, device driver installation fails.

SUMMARY OF THE INVENTION

The present invention has been made in consideration of the above-described related art, and provides a device driver installer and an installation method which reduce the burden on both the developing side and the use side by applying a generic device driver to a plurality of kinds of image forming apparatuses. The present invention further provides a device driver installer and an installation method which enable a generic device driver to provide even functions having an exclusive relationship. The present invention still further provides a device driver installer and an installation method which appropriately customize a device driver in a short time for an image forming apparatus to be used. The present invention further provides a device driver installer and an installation method which install a device driver even if an image forming apparatus to be used is unrecognizable.

The present invention has an arrangement of a device driver installer which installs a generic device driver corresponding to a plurality of kinds of image forming apparatuses, comprising: a type acquisition unit, configured to acquire, from an image forming apparatus, a type ID to specify a functional arrangement of the image forming apparatus; a driver specifying unit, configured to specify, based on the type ID, a generic device driver applicable to the image forming apparatus out of a plurality of generic device drivers; a unit, configured to specify, based on the type ID, customization information to customize the specified generic device driver for the image forming apparatus; and a customization unit, configured to customize and install the generic device driver in accordance with the customization information.

The present invention obviates the need for developing and maintaining different device drivers for respective image forming apparatuses and lightens the burden on both the device driver provider and the device driver user.

It is possible to install a device driver optimally customized for an image forming apparatus without making the user conscious of the difference of functions between image forming apparatuses. This improves the usability for the user.

The functions of an image forming apparatus are transferred using a type ID with a small data amount. This makes it possible to acquire information necessary for customization from the image forming apparatus using an information transfer method capable of transferring only a small quantity of data, for example, information transfer using USB On PID.

It is also possible to install a device driver customized to control image forming apparatuses developed in the past and those to be developed in the future. This improves the usability for the user.

Further features of the present invention will become apparent from the following description of exemplary embodiments with reference to the attached drawings.

BRIEF DESCRIPTION OF THE DRAWINGS

FIG. 1 is a block diagram showing an example of the arrangement of an image forming system according to the first embodiment of the present invention;

FIG. 4B is a view showing the relationship between a device driver and image forming apparatuses according to the present invention;

FIG. 4C is a view showing the relationship between a device driver and an image forming apparatus according to the present invention;

FIG. 6 is a view showing an example of association information stored in a device specifications conversion table;

FIGS. 7A-1 and 7A-2 are views showing details of the generic device drivers stored in a generic device driver storage area;

FIGS. 9A-1 and 9A-2 are flowcharts illustrating the processing procedure of the generic device driver installer operating on the client PC;

FIGS. 9B-1 and 9B-2 are flowcharts illustrating the processing procedure of the generic device driver installer operating on the client PC;

FIG. 10 is a block diagram showing an example of the arrangement of a FAX transmission system according to the second embodiment of the present invention;

FIG. 13 is a view showing an example of association information stored in a device specifications conversion table according to the second embodiment of the present invention;

FIGS. 14A-1 and 14A-2 are views showing details of the generic FAX drivers stored in a generic device driver storage area according to the second embodiment of the present invention.

DESCRIPTION OF THE EMBODIMENTS

[First Embodiment]
<Arrangement of Image Forming System>

Figures 1, 7A:
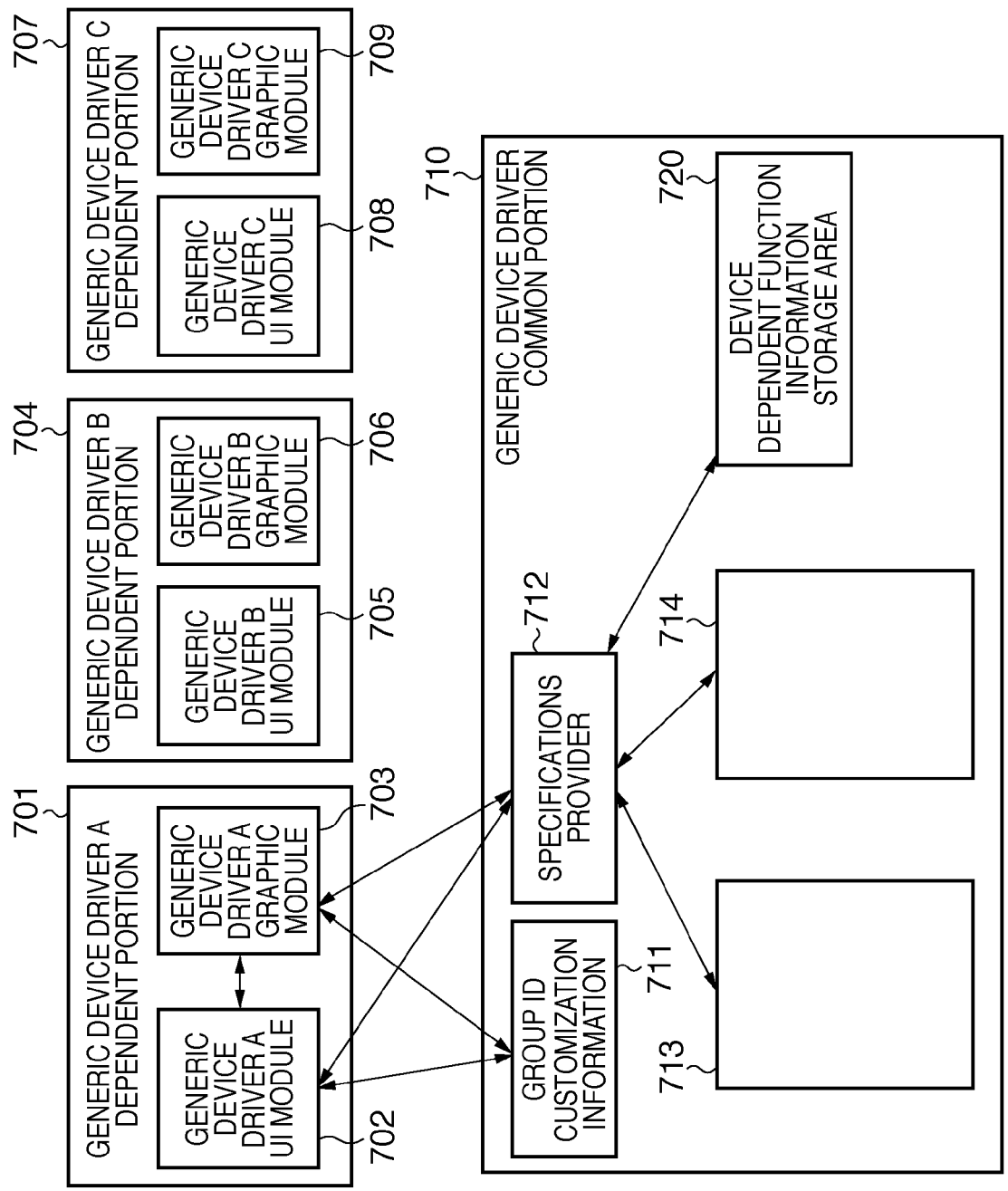

An embodiment of the present invention will now be described in detail with reference to the accompanying drawings. FIG. 1 is a block diagram showing an example of the arrangement of an image forming system according to the first embodiment of the present invention. As shown in FIG. 1, apparatuses included in the image forming system of this embodiment are connected via a network 107. The network 107 can have either one system or a plurality of systems.

Referring to FIG. 1, client computers 101, 102, and 103 are information processing apparatuses having a function of communicating with image forming apparatuses such as a printer and a digital MFP (Multi Function Peripheral) connected to the network 107. Software programs such as an operating system, device drivers for controlling image forming apparatuses, and image forming applications can be installed in each information processing apparatus.

In FIG. 1, an image forming apparatus 104 is image forming apparatus A. An image forming apparatus 105 is image forming apparatus B. An image forming apparatus 106 is image forming apparatus C. An image forming apparatus according to this embodiment is an MFP having at least an image data print function, a laser printer, or an inkjet printer. Each image forming apparatus has a function of receiving digital data from a client computer and executing print processing.

The image forming apparatus 104 is of the first type, which has the following functions and is designed to be controllable by a device control instruction set of type A.

(A1) Paper selecting function of type A: function of selecting plain paper, thick paper, or thin paper of A3, B4, A4, B5, A5, Legal, or Letter size as paper for use (A2) Paper cassette selecting function of type A: function of selecting one of four paper cassettes for use (A3) Color/monochrome print function of type A: color print function and monochrome print function (A4) Resolution selecting function of type A: function of printing image data at 600 dpi and function of printing image data at 1,200 dpi (A5) Finisher selecting function of type A: stapling function and case binding function (A6) Two-way communication function of type A: USB I/F two-way communication function and TCP/IP two-way communication function (A7) Function of communicating with a client PC and notifying it of type ID=AA generated in accordance with the functional arrangement of its own In this embodiment, the type ID is expressed by series ID+group ID. Each of the series ID and group ID is represented by a 1-byte letter in uppercase. The series ID of image forming apparatus A is A, and the group ID is A. Hence, the type ID is AA. Some image forming apparatuses record their type IDs in a ROM or the like in advance and return the type ID in response to a request.

The series ID represents an image forming apparatus series to which the image forming apparatus belongs. The series ID is used as information to specify a generic device driver usable to control the image forming apparatus. In this example, the image forming apparatus series is defined in accordance with the type of two-way communication function of each image forming apparatus.

The group ID represents a function group of image forming apparatuses. The group ID is used as customization information to specify how to customize the generic device driver to be used to control the image forming apparatus. In this example, the group ID is defined in accordance with the functions of each image forming apparatus within the series to which the image forming apparatus belongs.

The type ID is information to specify the functional arrangement of each image forming apparatus.

Note that the type ID may contain only the series ID or group ID in other embodiments.

The image forming apparatus B 105 is of the second type, which has the following functions and is designed to be controllable by the device control instruction set of type A.

(B1) Paper selecting function of type A: function of selecting plain paper, thick paper, or thin paper of A3, B4, A4, B5, A5, Legal, or Letter size as paper for use (B2) Paper cassette selecting function of type A: function of selecting one of four paper cassettes for use (B3) Color/monochrome print function of type B: monochrome print function (B4) Resolution selecting function of type A: function of printing image data at 600 dpi and function of printing image data at 1,200 dpi (B5) Two-way communication function of type B: TCP/IP two-way communication function The image forming apparatus B 105 is an old model and therefore has no function of communicating with a client PC and notifying it of a type ID generated in accordance with the functional arrangement of its own.

The image forming apparatus C 106 is of the third type, which has the following functions and is designed to be controllable by a device control instruction set of type D.

(C1) Paper selecting function of type C: function of selecting plain paper or thin paper of A4, B5, A5, Legal, or Letter size as paper for use
(C2) Color/monochrome print function of type B: monochrome print function
(C3) Resolution selecting function of type B: function of printing image data at 600 dpi
(C4) Two-way communication function of type D: 1394 I/F two-way communication function
(C5) Function of communicating with a client PC and notifying it of type ID=DD generated in accordance with the functional arrangement of its own The series ID of image forming apparatus C is D, the group ID is D, and the type ID is DD.

The device control instruction set of type D includes a device control instruction set of type C. The two-way communication function of type D includes a two-way communication function of type C.

Figure 2:
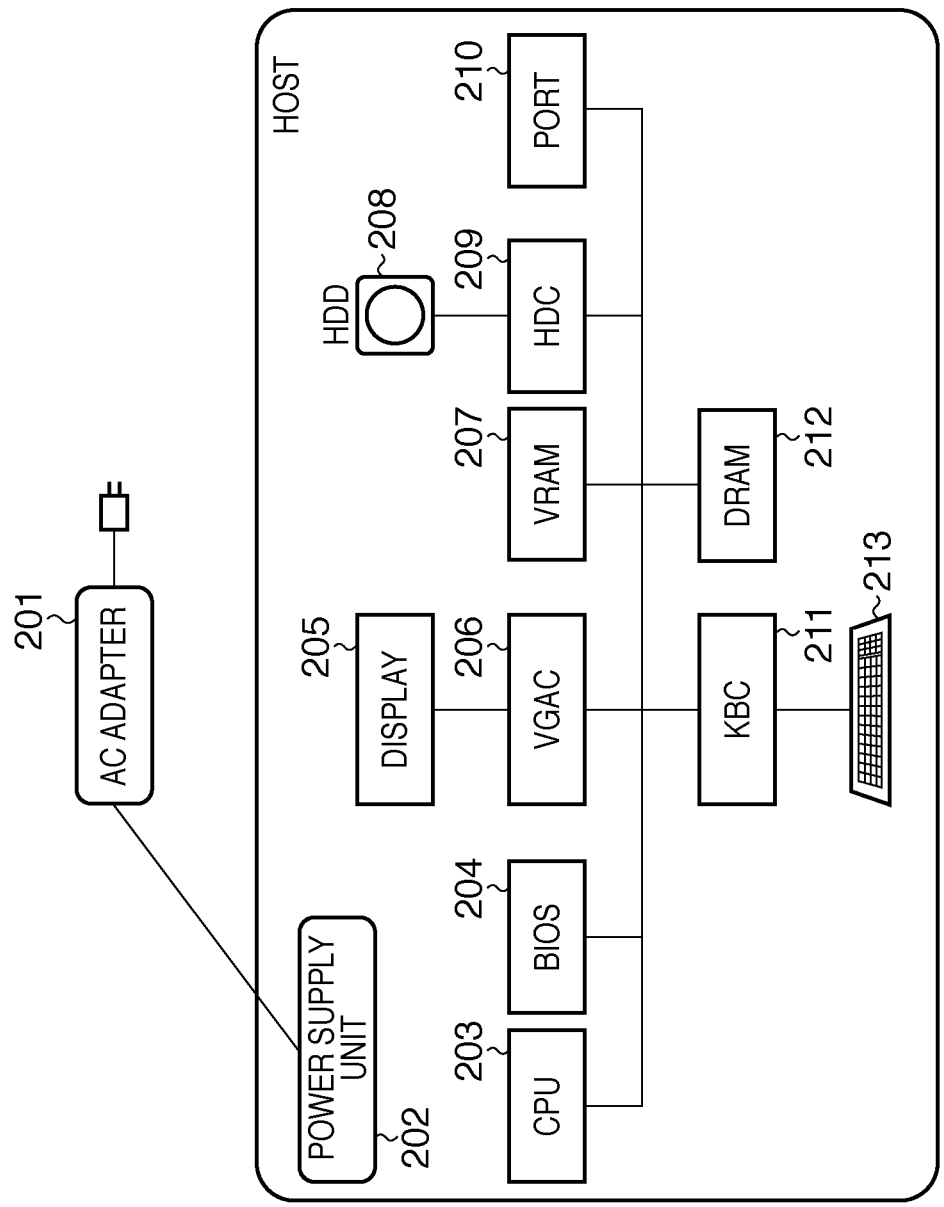
FIG. 2 is a block diagram showing the internal arrangement of a client PC.

FIG. 2 is a block diagram showing the internal arrangement of the client PC. The client PC has an external AC adapter 201 as the power supply. The client PC incorporates the following units:

power supply unit 202,
CPU 203,
BIOS 204,
display 205 formed from, for example, an LCD
video controller (VGAC) 206,
video memory (VRAM) 207,
hard disk drive (HDD) 208,
hard disk controller (HDC) 209,
network port (PORT) 210,
keyboard controller (KBC) 211,
main memory (DRAM) 212, and
keyboard 213.

In the host unit of the personal computer, the power supply unit 202 supplies power to the respective units. The CPU (Central Processing Unit) 203 is responsible for main control. The BIOS 204 is a program to give instructions for basic control. The BIOS 204 is recorded in a ROM. The hard disk controller (HDC) 209 controls the hard disk drive (HDD) 208 which is a recordable nonvolatile memory device. The CPU reads out a software program from the hard disk drive 208, expands it on the main memory 212, and executes the program using the main memory 212. At this time, screen display is done by causing the video controller (VGAC) 206 to display, on the display 205, characters and the like written in the video memory (VRAM) 207. A user operation is performed by key input from the keyboard 213. The keyboard controller (KBC) 211 processes the received key input information. The network port 210 performs network communication with the image forming apparatuses connected to the network. Software programs such as an OS (Operating System), various kinds of applications, device driver installers, and device drivers are recorded in the hard disk drive (HDD) 208 and executed by the CPU 203. The device drivers include installed generic device drivers for the image forming apparatuses. The user can execute setup of the image forming system, information acquisition from the image forming apparatuses, and print processing by operating the various kinds of software recorded in the hard disk drive (HDD) 208.

Figure 3:
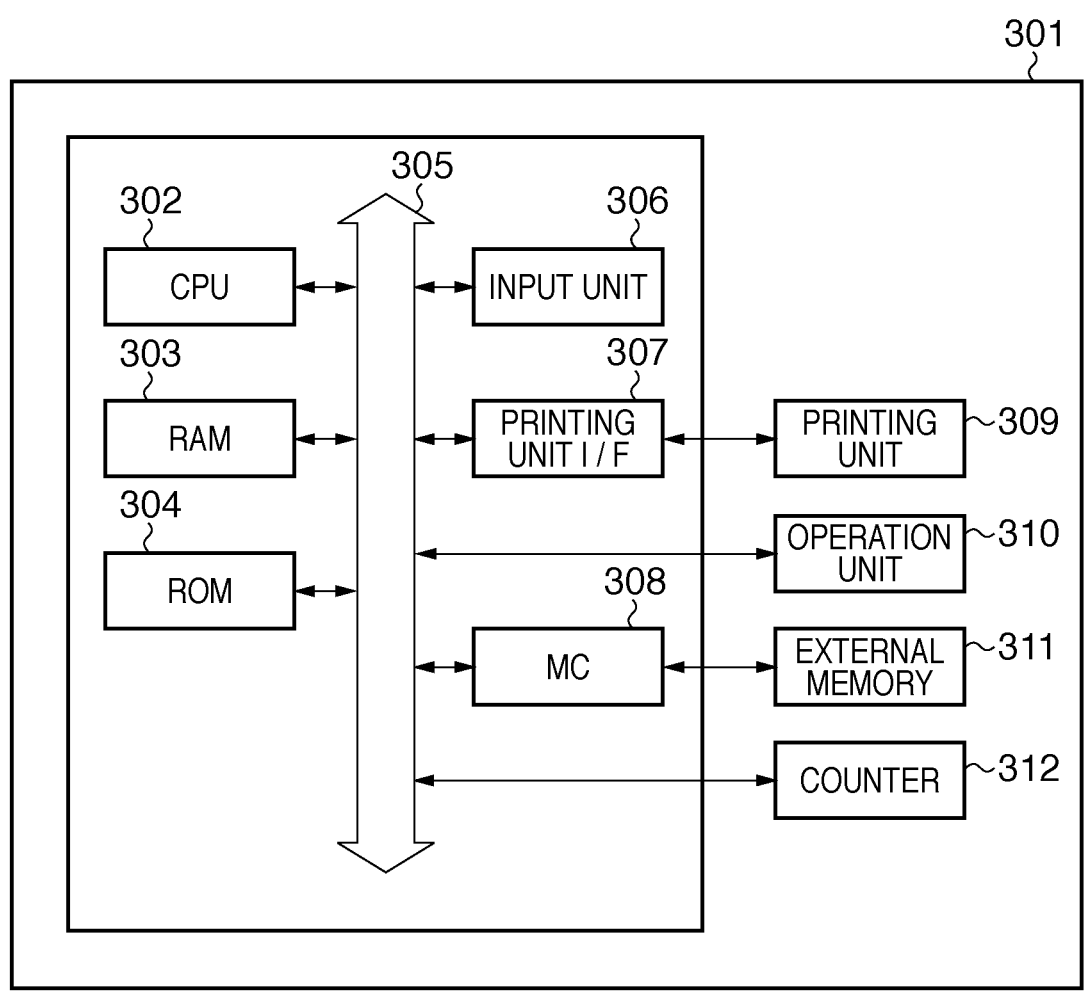
FIG. 3 is a block diagram showing the internal arrangement of an image forming apparatus according to the first embodiment of the present invention.

FIG. 3 is a block diagram showing the internal arrangement of the image forming apparatus according to the first embodiment of the present invention. The arrangement is common to the image forming apparatuses 104 to 106.

A CPU 302 controls an image forming apparatus 301. Based on, for example, a control program stored in a ROM 304 or an external memory 311, the CPU 302 outputs an image signal as output information to a printing unit (printer engine) 309 connected to a system bus 305 via a printing unit I/F 307. The ROM 304 stores the control program of the CPU 302 and the like. The font ROM of the ROM 304 stores, for example, font data to be used to generate the output information. The data ROM of the ROM 304 stores, for example, information to be used on the host computer if the image forming apparatus does not include the external memory 311 such as a hard disk.

The CPU 302 can communicate with a client PC via an input unit 306 and notify it of information or the like in the printer. A RAM 303 functions as, for example, the main memory or work area of the CPU 302. The RAM 303 is designed to be able to increase its memory capacity using an optional RAM connected to an add-on port (not shown). Note that the RAM 303 serves as, for example, an output information expansion area, an environment data storage area, and an NVRAM. A memory controller (MC) 308 controls access to the external memory 311 formed from a hard disk drive (HDD) or an IC card. The external memory 311 stores, for example, font data, an emulation program, and form data in addition to the above-described control program. An operation panel 310 includes switches and LED indicators for operations.

The image forming apparatus 301 also includes a counter 312 which counts the number of printed sheets for charging. The CPU 302 can control the counting operation of the counter 312.

The ROM 304 or the external memory 311 stores the type ID, that is, information to specify the functional arrangement of the image forming apparatus.

The above-described external memory 311 need not always be one. Alternatively, a plurality of external memories may be connected, which store optional cards and programs for interpreting printer control languages of different language systems in addition to built-in fonts.

<Example of Correspondence between Generic Device Drivers and Image Forming Apparatuses>

Figure 4A:
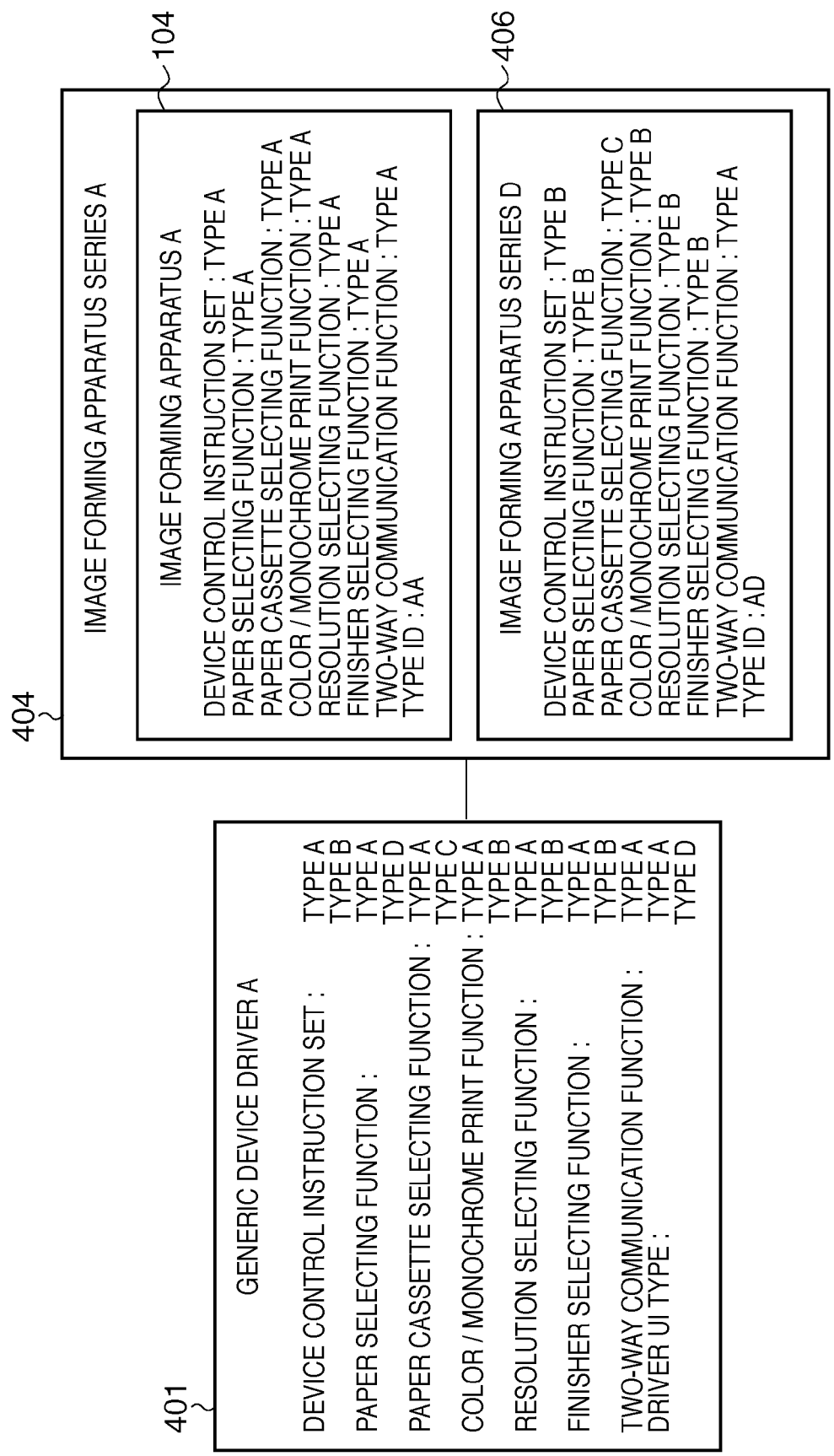
FIG. 4A is a view showing the relationship between a device driver and image forming apparatuses according to the present invention.

FIGS. 4A, 4B, and 4C are views showing the relationship between device drivers and image forming apparatuses according to the present invention. Referring to FIG. 4A, reference numeral 104 denotes image forming apparatus A; and 406, image forming apparatus D. Referring to FIG. 4B, reference numeral 105 denotes image forming apparatus B; and 409, image forming apparatus E. Referring to FIG. 4C, reference numeral 411 denotes image forming apparatus F. The arrangements of the image forming apparatuses A 104 and B 105 have already been described.

The image forming apparatus D 406 has the following functions and is designed to be controllable by the device control instruction set of type B.

(D1) Paper selecting function of type D: function of selecting plain paper of A3, B4, A4, B5, A5, Legal, or Letter size as paper for use
(D2) Paper cassette selecting function of type C: function of selecting one paper cassette for use
(D3) Color/monochrome print function of type B: monochrome print function
(D4) Resolution selecting function of type B: function of printing image data at 600 dpi (D5) Finisher selecting function of type B: stapling function
(D6) Two-way communication function of type A: USB I/F two-way communication function and TCP/IP two-way communication function
(D7) Function of communicating with a client PC and notifying it of type ID=AD generated in accordance with the functional arrangement of its own The image forming apparatus E 409 has the following functions and is designed to be controllable by the device control instruction set of type A.
(E1) Paper selecting function of type A: function of selecting plain paper, thick paper, or thin paper of A3, B4, A4, B5, A5, Legal, or Letter size as paper for use
(E2) Paper cassette selecting function of type A: function of selecting one of four paper cassettes for use
(E3) Color/monochrome print function of type B: monochrome print function
(E4) Resolution selecting function of type A: function of printing image data at 600 dpi and function of printing image data at 1,200 dpi
(E5) Two-way communication function of type B: TCP/IP two-way communication function
(E6) Function of communicating with a client PC and notifying it of type ID=BB generated in accordance with the functional arrangement of its own The image forming apparatus F 411 has the following functions and is designed to be controllable by the device control instruction set of type C.
(F1) Paper selecting function of type C: function of selecting plain paper or thin paper of A4, B5, A5, Legal, or Letter size as paper for use
(F2) Color/monochrome print function of type B: monochrome print function
(F3) Resolution selecting function of type B: function of printing image data at 600 dpi
(F4) Two-way communication function of type C: without 1394 I/F two-way communication function
(F5) Function of communicating with a client PC and notifying it of type ID=CC generated in accordance with the functional arrangement of its own Referring to FIGS. 4A to 4C, each image forming apparatus belongs to one of an image forming apparatus series A 404, an image forming apparatus series B 407, and an image forming apparatus series C 410. The image forming apparatus series are generated by classifying and grouping the image forming apparatuses depending on the type of two-way communication function. In this example, the two-way communication functions of the image forming apparatuses are classified into three types A, B, and C which have an exclusive relationship. It is therefore impossible to make one device driver have a plurality of two-way communication functions of different types and control the image forming apparatuses by selectively using the functions. For this reason, the image forming apparatuses are classified by the type of two-way communication function. These classifications are the series.

As shown in FIG. 4A, the image forming apparatuses A 104 and D 406 have the two-way communication function of type A and are therefore classified into the group of type A, thereby forming the image forming apparatus series A 404.

Similarly, the image forming apparatuses B 105 and E 409 have the two-way communication function of type B and are so classified into the group of type B, thereby forming the image forming apparatus series B 407.

The image forming apparatus F 411 has the two-way communication function of type C and is therefore classified into the group of type C, thereby forming the image forming apparatus series C 410.

Referring to FIGS. 4A to 4C, there are three generic device drivers, that is, a generic device driver A 401, a generic device driver B 402, and a generic device driver C 403 for the image forming apparatuses. The generic device driver A 401 is a device driver for the image forming apparatuses belonging to the image forming apparatus series A 404. The generic device driver A 401 has a function of providing a driver UI screen of type A or D to the user, and a function of controlling an image forming apparatus by transmitting the device control instruction set of type A or B to it.

Similarly, the generic device driver B 402 is a device driver for the image forming apparatuses belonging to the image forming apparatus series B 407. The generic device driver B 402 has a function of providing a driver UI screen of type A or B to the user, and a function of controlling an image forming apparatus by transmitting the device control instruction set of type A to it.

The generic device driver C 403 is a device driver for the image forming apparatuses belonging to the image forming apparatus series C 410. The generic device driver C 403 has a function of providing a driver UI screen of type C to the user, and a function of controlling an image forming apparatus by transmitting the device control instruction set of type C to it.

Each generic device driver has various kinds of functions conforming to the functions of a plurality of kinds of image forming apparatuses belonging to a corresponding image forming apparatus series, and a function of customizing itself in accordance with the functions of each image forming apparatus. That is, each generic device driver is customized for the image forming apparatuses belonging to the corresponding image forming apparatus series.

For example, to control the functions of the image forming apparatuses A 104 and D 406, the generic device driver A 401 has the following functions.
(A1) Paper selecting function of type A: function of causing the user to select plain paper, thick paper, or thin paper of A3, B4, A4, B5, A5, Legal, or Letter size as paper and issuing a control instruction
(D1) Paper selecting function of type D: function of causing the user to select plain paper of A3, B4, A4, B5, A5, Legal, or Letter size as paper and issuing a control instruction
(A2) Paper cassette selecting function of type A: function of causing the user to select one of four paper cassettes and issuing a control instruction
(D2) Paper cassette selecting function of type C: function of causing the user to select one paper cassette and issuing a control instruction
(A3) Color/monochrome print function of type A: function of issuing a color or monochrome print instruction
(D3) Color/monochrome print function of type B: function of issuing a monochrome print instruction
(A4) Resolution selecting function of type A: function of issuing a 600 dpi or 1,200 dpi print instruction
(D4) Resolution selecting function of type B: function of issuing a 600 dpi print instruction
(A5) Finisher selecting function of type A: function of causing the user to select stapling or case binding and issuing a control instruction
(D5) Finisher selecting function of type B: function of causing the user to select stapling and issuing a control instruction
(AD6) Two-way communication function of type A: function of exchanging information with the image forming apparatus A 104 or D 406 by USB I/F two-way communication or TCP/IP two-way communication
(GA1) Function of displaying the driver UI screen of type A or D and providing GUI to the user Similarly, to control the functions of the image forming apparatuses B 105 and E 409, the generic device driver B 402 has the following functions.

(BE1) Paper selecting function of type A: function of causing the user to select plain paper, thick paper, or thin paper of A3, B4, A4, B5, A5, Legal, or Letter size as paper and issuing a control instruction (BE2) Paper cassette selecting function of type A: function of causing the user to select one of four paper cassettes and issuing a control instruction (BE3) Color/monochrome print function of type B: function of issuing a monochrome print instruction (BE4) Resolution selecting function of type A: function of issuing a 600 dpi or 1,200 dpi print instruction (BE5) Two-way communication function of type B: function of exchanging information with the image forming apparatus B 105 or E 409 by TCP/IP two-way communication (GB1) Function of displaying the driver UI screen of type A and providing GUI to the user To control the functions of the image forming apparatus F 411, the generic device driver C 403 has the following functions.

(C1) Paper selecting function of type C: function of causing the user to select plain paper or thin paper of A4, B5, A5, Legal, or Letter size as paper and issuing a control instruction (C2) Color/monochrome print function of type B: function of issuing a monochrome print instruction (C3) Resolution selecting function of type B: function of issuing a 600 dpi print instruction (C4) Two-way communication function of type C: function of exchanging information with the image forming apparatus F 411 by TCP/IP two-way communication (GC1) Function of displaying the driver UI screen of type C and providing GUI to the user As shown in FIGS. 4A to 4C, the relationship between the numbers of image forming apparatuses and the number of device drivers is five to three. The device drivers and the functions of the plurality of image forming apparatuses belonging to the image forming apparatus series make pairs. In this embodiment, the generic device drivers A 401, B 402, and C 403 shown in FIGS. 4A to 4C are packaged together to form one generic device driver installer. The generated generic device driver installer is stored in the hard disk drive (HDD) 208 of the client PC.

<Arrangement of Generic Device Driver Installer>

Figure 5:
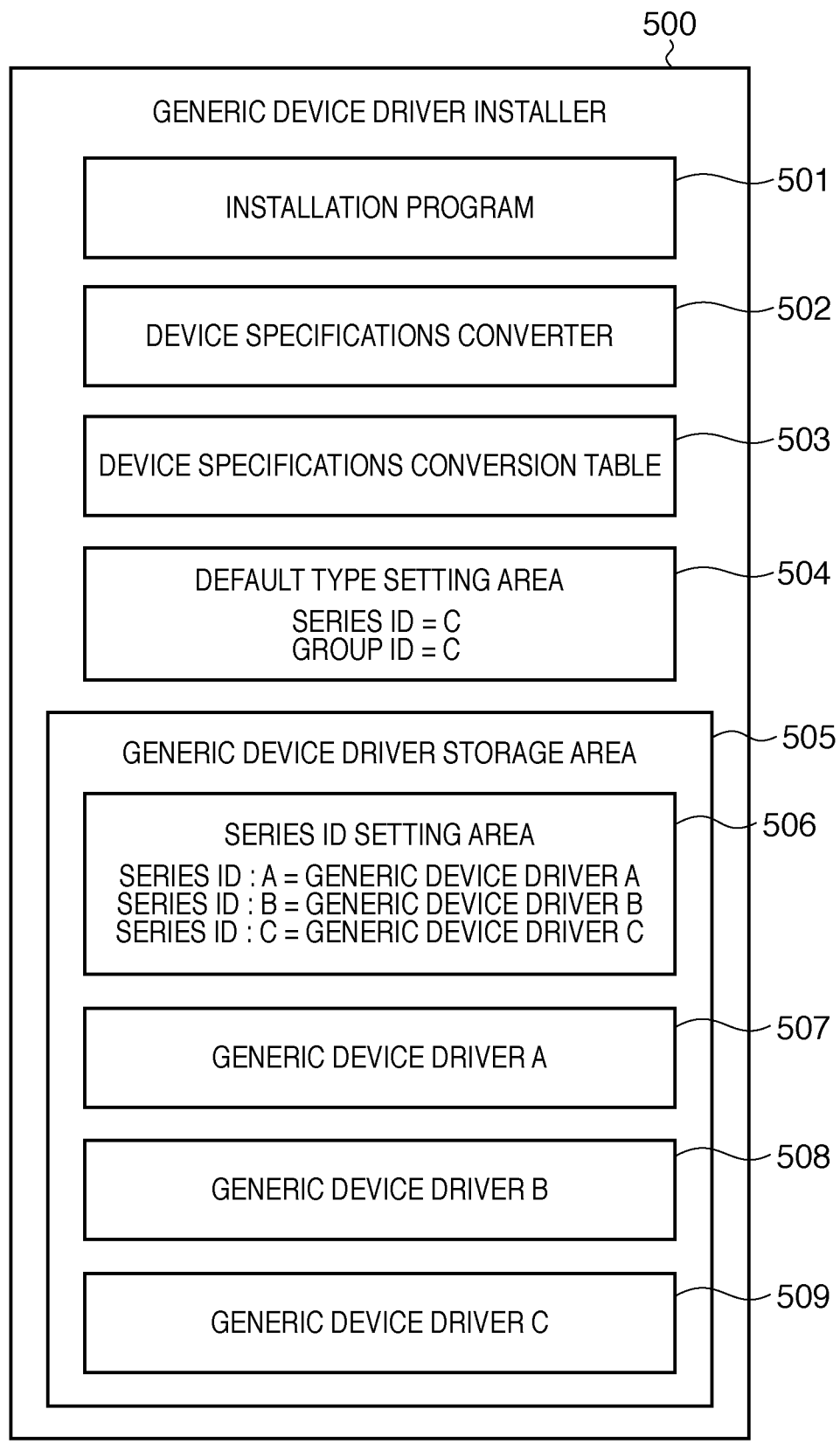
FIG. 5 is a block diagram showing the arrangement of a generic device driver installer.

FIG. 5 is a block diagram showing the arrangement of the generic device driver installer. Referring to FIG. 5, an installation program 501 to be activated in accordance with a user instruction has a function of installing a generic device driver 500 in a client PC. More specifically, the installation function includes the following functions.

(1) Function of acquiring, from an image forming apparatus, the type ID generated in accordance with its functional arrangement and specifying a generic device driver using the series ID contained in the type ID (2) Function of acquiring, from an image forming apparatus, the type ID generated in accordance with its functional arrangement and specifying the customization information of the generic device driver based on the group ID contained in the type ID (3) Function of customizing the generic device driver in accordance with the customization information and installing it in the information processing apparatus (4) Function of customizing the generic device driver in accordance with default information and installing it if no identifiable type ID has been acquired from the image forming apparatus (5) Function of acquiring identification information of the image forming apparatus and converting it into a type ID by referring to a device specifications conversion table held in the installer if no type ID has been acquired from the image forming apparatus A device specifications converter 502 has a function of converting the identification information of an image forming apparatus into a type ID by referring to a device specifications conversion table 503. The device specifications conversion table 503 holds the association information between the identification information and the type ID of an image forming apparatus.

A default type setting area 504 holds a default series ID and a default group ID which are used when no identifiable type ID is acquired from an image forming apparatus. In this embodiment, series ID: C and group ID: C are held as default values.

A generic device driver storage area 505 includes a series ID storage area 506, a generic device driver A 507, a generic device driver B 508, and a generic device driver C 509.

The series ID storage area 506 stores the association information between the series IDs and the generic device drivers. Referring to the series ID storage area enables to specify one generic device driver corresponding to one series ID. In this embodiment, when series ID=A, the generic device driver A can be specified as the generic device driver suitable for the image forming apparatus series. When series ID=B, the generic device driver B can be specified as the generic device driver suitable for the image forming apparatus series. When series ID=C, the generic device driver C can be specified as the generic device driver suitable for the image forming apparatus series.

FIG. 6 is a view showing an example of association information stored in the device specifications conversion table 503. As shown in FIG. 6, the device specifications conversion table stores the identification information and type ID of an image forming apparatus in association with each other. For example, "type ID=BB", "type ID=AA", "type ID=AD", and "type ID=CC" are associated with "identification information=image forming apparatus B", "identification information=image forming apparatus P", "identification information=image forming apparatus Q", and "identification information=image forming apparatus R", respectively. In addition, "type ID=BB" and "type ID=AA" are associated with "identification information=image forming apparatus S" and "identification information=image forming apparatus T", respectively.

FIGS. 7A-1, 7A-2 and 7B are views showing details of the generic device drivers stored in the generic device driver storage area 505. In this embodiment, the generic device drivers are packaged together in the generic device driver installer and stored in the hard disk drive 208 of the client PC.

One generic device driver includes one generic device driver dependent portion and one generic device driver common portion. There is only one generic device driver common portion common to all generic device drivers.

Referring to FIGS. 7A-1 and 7A-2, one generic device driver dependent portion includes a UI module and a graphic module.

A generic device driver A dependent portion 701 includes a generic device driver A UI module 702 and a generic device driver A graphic module 703. Similarly, a generic device driver B dependent portion 704 includes a generic device driver B UI module 705 and a generic device driver B graphic module 706. A generic device driver C dependent portion 707 includes a generic device driver C UI module 708 and a generic device driver C graphic module 709.

The generic device driver UI modules 702, 705, and 708 are program modules each of which has a function of changing, in accordance with customization information, the GUI function it should provide to the user. The generic device driver graphic modules 703, 706, and 709 are program modules each of which has a function of changing the image forming apparatus control function in accordance with customization information.

In a generic device driver common portion 710 shown in FIG. 7A-1, an area 711 stores a type ID specified by the installer at the time of installation and customization information acquired by the generic device driver UI module. In this embodiment, the area 711 is allocated in a nonvolatile memory. Strictly speaking, the area 711 is not included in the installer (or installation set).

A specifications provider 712 has a function of providing the customization information and customization function information of a generic device driver in response to a query from the generic device driver UI module and the generic device driver graphic module.

A customization information storage area 713 holds, in correspondence with each group ID, function information necessary for a device driver to control image forming apparatuses having a specific group ID. In this embodiment, the customization information storage area 713 holds group A function information necessary for controlling devices having a group ID "A", group B function information necessary for controlling devices having a group ID "B", group C function information necessary for controlling devices having a group ID "C", and group D function information necessary for controlling devices having a group ID "D". The customization information storage area 713 allows addition, editing, and deletion of group ID specific function information any time.

A device independent function information storage area 714 stores, for each function unit, function information which is independent of the functions of the image forming apparatuses and can be provided by the device drivers. In this embodiment, the device independent function information storage area 714 includes a driver UI type unit 715.

The driver UI type unit 715 in the device independent function information storage area 714 stores and manages UI function information the device drivers can provide to the user. In the example, the driver UI type unit 715 includes type A function information 716, type B function information 717, type C function information 718, and type D function information 719. The type A function information 716 sets "UI template 1" as a template, "Japanese" as a resource language, and "type A" as a Bitmap type. This information represents that when displaying a UI, the device driver needs to use UI template 1, Japanese resource information, and type A Bitmap.

The type B function information 717 sets "UI template 2" as a template, "Japanese" as a resource language, and "type A" as a Bitmap type. This information represents that when displaying a UI, the device driver needs to use UI template 2, Japanese resource information, and type A Bitmap.

The type C function information 718 sets "UI template 1" as a template, "English" as a resource language, and "type B" as a Bitmap type. This information represents that when displaying a UI, the device driver needs to use UI template 1, English resource information, and type B Bitmap.

The type D function information 719 sets "UI template 2" as a template, "English" as a resource language, and "type B" as a Bitmap type. This information represents that when displaying a UI, the device driver needs to use UI template 2, English resource information, and type B Bitmap.

The device independent function information storage area 714 allows addition, editing, and deletion of function units any time.

Figure 7B:
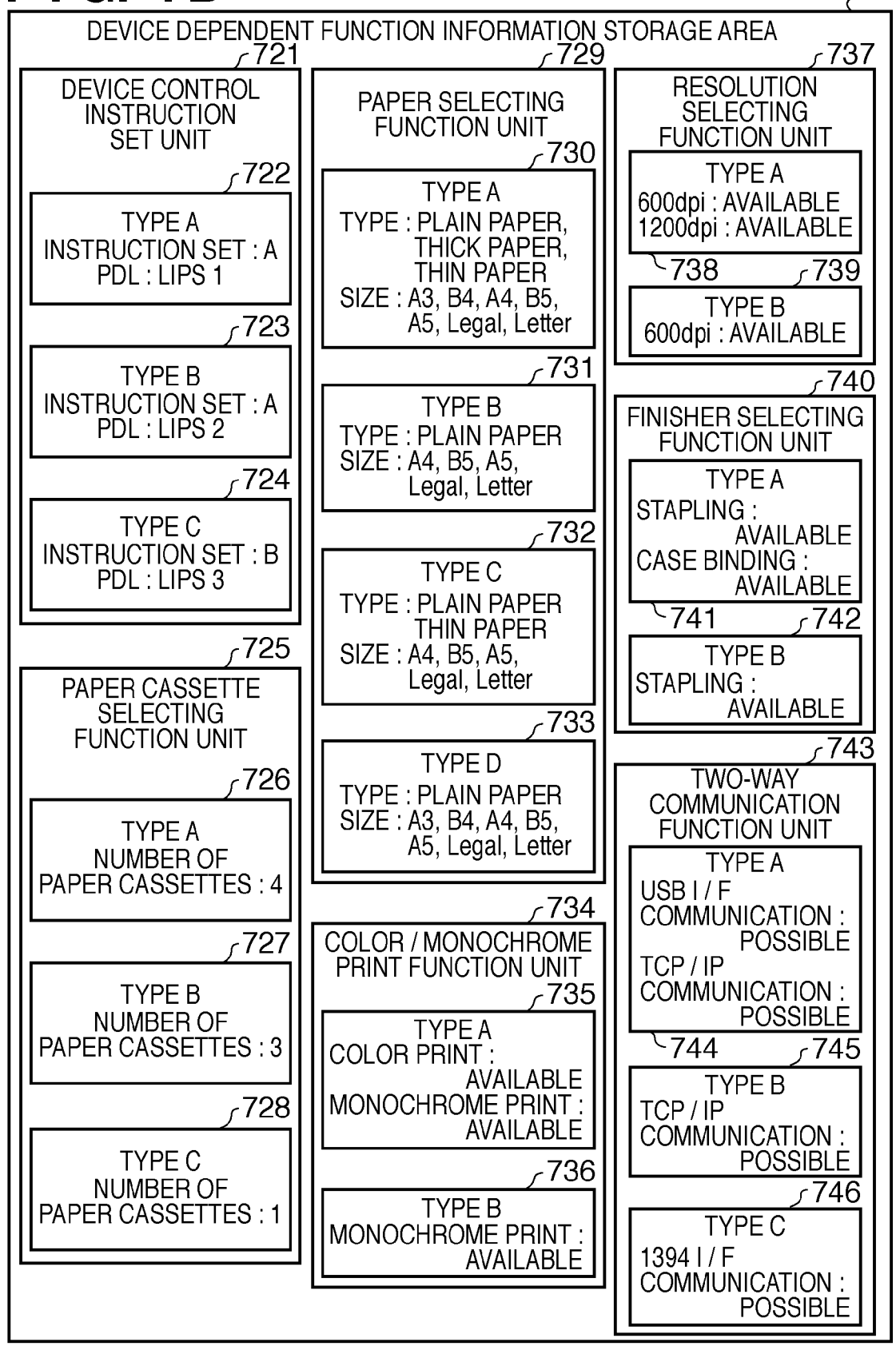
FIG. 7B is a view showing details of the generic device drivers stored in the generic device driver storage area.

A device dependent function information storage area 720 stores, for each function unit, function information which depends on the functions of the image forming apparatuses and can be provided by the device drivers. FIG. 7B shows details. In this embodiment, the device dependent function information storage area 720 includes a device control instruction set unit 721, a paper cassette selecting function unit 725, a paper selecting function unit 729, a color/monochrome print function unit 734, a resolution selecting function unit 737, a finisher selecting function unit 740, and a two-way communication function unit 743.

The device control instruction set unit 721 stores information about the control instructions of the image forming apparatuses usable by the device drivers. The device control instruction set unit 721 includes type A function information 722, type B function information 723, and type C function information 724. The type A function information 722 sets "instruction set: A", and "PDL: LIPS1". This information represents that it is necessary to use the instruction set A as a device control instruction and LIPS1 as a print control language.

The type B function information 723 sets "instruction set: A", and "PDL: LIPS2". This information represents that it is necessary to use the instruction set A as a device control instruction and LIPS2 as a print control language.

The type C function information 724 sets "instruction set: B", and "PDL: LIPS3". This information represents that it is necessary to use the instruction set B as a device control instruction and LIPS3 as a print control language.

The paper cassette selecting function unit 725 stores information about the cassette selecting functions of the image forming apparatuses usable by the device drivers. The paper cassette selecting function unit 725 includes type A function information 726, type B function information 727, and type C function information 728. The type A function information 726 sets "4" as the number of paper cassettes. This information represents that it is possible to make a user select one of four paper cassettes and issue a control instruction to an image forming apparatus so as to print using the cassette. The type B function information 727 sets "3" as the number of paper cassettes. This information represents that it is possible to make a user select one of three paper cassettes and issue a control instruction to an image forming apparatus so as to print using the cassette. The type C function information 728 sets "1" as the number of paper cassettes. This information represents that it is possible to issue a control instruction to an image forming apparatus so as to print using one cassette.

The paper selecting function unit 729 stores information about paper usable by the device drivers. The paper selecting function unit 729 includes type A function information 730, type B function information 731, type C function information 732, and type D function information 733. The type A function information 730 sets "type: plain paper, thick paper, thin paper" and "size: A3, B4, A4, B5, A5, Legal, Letter". This information represents that it is possible to make a user select plain paper, thick paper, or thin paper of A3, B4, A4, B5, A5, Legal, or Letter size as paper and issue a control instruction to an image forming apparatus so as to print using the paper. The type B function information 731 sets "type: plain paper" and "size: A4, B5, A5, Legal, Letter". This information represents that it is possible to make a user select plain paper of A4, B5, A5, Legal, or Letter size as paper and issue a control instruction to an image forming apparatus so as to print using the paper. The type C function information 732 sets "type: plain paper, thin paper" and "size: A4, B5, A5, Legal, Letter". This information represents that it is possible to make a user select plain paper or thin paper of A4, B5, A5, Legal, or Letter size as paper and issue a control instruction to an image forming apparatus so as to print using the paper. The type D function information 733 sets "type: plain paper" and "size: A3, B4, A4, B5, A5, Legal, Letter". This information represents that it is possible to make a user select plain paper of A3, B4, A4, B5, A5, Legal, or Letter size as paper and issue a control instruction to an image forming apparatus so as to print using the paper.

The color/monochrome print function unit 734 stores information about the color/monochrome print functions of the image forming apparatuses usable by the device drivers. The color/monochrome print function unit 734 includes type A function information 735 and type B function information 736. The type A function information 735 sets "color print: available" and "monochrome print: available". This information represents that it is possible to issue a color print instruction or a monochrome print instruction to an image forming apparatus in accordance with the type of print data or a user instruction. The type B function information 736 sets "monochrome print: available". This information represents that no color print instruction is issuable, and a monochrome print instruction needs to be issued to an image forming apparatus.

The resolution selecting function unit 737 stores information about the print resolutions of the image forming apparatuses usable by the device drivers. The resolution selecting function unit 737 includes type A function information 738 and type B function information 739. The type A function information 738 sets "600 dpi: available" and "1200 dpi: available". This information represents that it is possible to issue a 600 dpi print instruction or a 1200 dpi print instruction to an image forming apparatus in accordance with the type of print data or a user instruction. The type B function information 739 sets "600 dpi: available". This information represents that no 1200 dpi print instruction is issuable, and a 600 dpi print instruction needs to be issued to an image forming apparatus.

The finisher selecting function unit 740 stores information about the functions of finishers provided on the image forming apparatuses usable by the device drivers. The finisher selecting function unit 740 includes type A function information 741 and type B function information 742. The type A function information 741 sets "stapling: available" and "case biding: available". This information represents that it is possible to issue a stapling processing instruction or a case binding processing execution instruction to an image forming apparatus in accordance with a user instruction. The type B function information 742 sets "case binding: available". This information represents that it is possible to issue a case binding processing execution instruction to an image forming apparatus in accordance with a user instruction.

The two-way communication function unit 743 stores information about the two-way communication functions usable by the device drivers. The two-way communication function unit 743 includes type A function information 744, type B function information 745, and type C function information 746. The type A function information 744 sets "USB I/F communication: possible" and "TCP/IP communication: possible". This information represents that the device driver can exchange information with an image forming apparatus by two-way communication using USB I/F and TCP/IP communications. The type B function information 745 sets "TCP/IP communication: possible". This information represents that the device driver can exchange information with an image forming apparatus by two-way communication using TCP/IP communication. The type C function information 746 sets "1394 I/F communication: possible". This information represents that the device driver can exchange information with an image forming apparatus by two-way communication using 1394 I/F communication.

The device dependent function information storage area 720 allows addition, editing, and deletion of function units any time.

<Processing of Generic Device Driver Installer>

FIGS. 8A, 8B, 9A-1, 9A-2, 9B-1 and 9B-2 are flowcharts illustrating the processing procedure of the generic device driver installer operating on the client PC. Processing of customizing a generic device driver for controlling an image forming apparatus and installing it in a client PC 1 will be described with reference to FIGS. 8A, 8B, 9A-1, 9A-2, 9B-1 and 9B-2B. Generic device driver installer is realized as an application program of installer on Operating System (OS) or a part of the OS.

On the client PC 1, the user designates an image forming apparatus as a control target and activates the generic device driver installer stored in the HDD 208 using the function provided by the OS.

The CPU 203 reads out the generic device driver installer, expands it on the main memory 212, and executes the program using the memory.

Then, the generic device driver installer, and more specifically, the installation program 501 is executed to perform the processing shown in FIGS. 8A, 8B, 9A-1, 9A-2, 9B-1 and 9B-2. Note that these flowcharts explain a series of processes, and the drawing numbers will not particularly be specified in the following description.

First, in step S801, the generic device driver installer searches for the image forming apparatus designated as the control target and acquires, from the image forming apparatus, a type ID generated in accordance with its functional arrangement. In this embodiment, when the control target is image forming apparatus A, "type ID: AA" is acquired. When the control target is image forming apparatus C, "type ID: DD" is acquired. When the control target is image forming apparatus B, no type ID is acquired.

The generic device driver acquires the type ID by communicating with the image forming apparatus via the network, USB I/F, or 1394 I/F. In other embodiments, the type ID format and the acquisition method are not limited to those described above.

In step S802, the installer determines whether the type ID is acquired from the image forming apparatus. When the control target is image forming apparatus A, "type ID: AA" is acquired, and the process therefore advances to step S803. The installer analyzes the type ID and acquires "series ID: A" and "group ID: A" contained in the type ID.

Similarly, when the control target is image forming apparatus C, the process advances to step S803. The installer acquires "series ID: D" and "group ID: D" contained in the type ID.

On the other hand, when the control target is image forming apparatus B, no type ID is acquired, and the process therefore advances to step S804. The installer acquires identification information from the image forming apparatus. In this embodiment, the installer acquires, as the identification information from image forming apparatus B, information representing that the control target is image forming apparatus B.

The process advances to step S805. The installer determines whether the identification information is acquired. If it is determined that no identification information is acquired because of, for example, a communication error, the process advances to step S810. The installer displays an error message representing that no device driver exists, and ends the processing.

Upon determining that the identification information is acquired, the process advances to step S806. The installer causes the device specifications converter 502 to search the device specifications conversion table 503 using the identification information as a key in order to acquire the type ID of the image forming apparatus. In step S807, the installer determines whether the identification information is registered in the device specifications conversion table 503. If the identification information is registered, the process advances to step S808 to acquire a type ID corresponding to the identification information.

Then, the process advances to step S803. The installer analyzes the type ID and acquires a series ID and a group ID contained in the type ID. In this embodiment, "type ID: BB" is registered in the device specifications conversion table 503 in correspondence with image forming apparatus B, as shown in FIG. 6. Hence, when the control target is image forming apparatus B, "type ID: BB", "series ID: B", and "group ID: B" are acquired.

If it is determined in step S807 that the identification information is not registered, the process advances to step S809. The installer acquires the default series ID and group ID by referring to the default type setting area 504 of its own. Note that when the user has designated the image forming apparatus as the control target, the port of the search target may have been designated. In that case, a series ID corresponding to the designated port may be adopted, and the default value may be obtained only for the group ID. In this embodiment, if the identification information is not registered, "series ID: C" and "group ID: C" are acquired as default values.

Then, the process advances to step S811. To specify the generic device driver to be installed, the installer refers to the series ID storage area 506 of its own, thereby specifying the corresponding generic device driver in step S811. In step S812, the installer determines whether the generic device driver is specified. If the generic device driver cannot be specified, the process advances to step S817. The installer acquires the default series ID by referring to the default type setting area 504 of its own and returns the process to step S811. In this embodiment, when the control target is image forming apparatus C, the generic device driver cannot be specified in step S812. In this case, the installer acquires "C" as the default series ID.

If the generic device driver is specified in step S812, the process advances to step S813. The installer stores the acquired group ID in the nonvolatile memory.

In step S814, the installer confirms using the function of the OS whether the generic device driver specified in step S812 has already been installed. If the generic device driver has not been installed, the process advances to step S815. The installer installs the specified generic device driver and advances the process to step S816.

If the generic device driver has already been installed, the process advances to S816. In step S816, the installer initializes the generic device driver to customize it. In this embodiment, when the control target is image forming apparatus A, generic device driver A is initialized. When the control target is image forming apparatus B, generic device driver B is initialized. When the control target is image forming apparatus C, generic device driver C is initialized.

Figures 1, 9A:
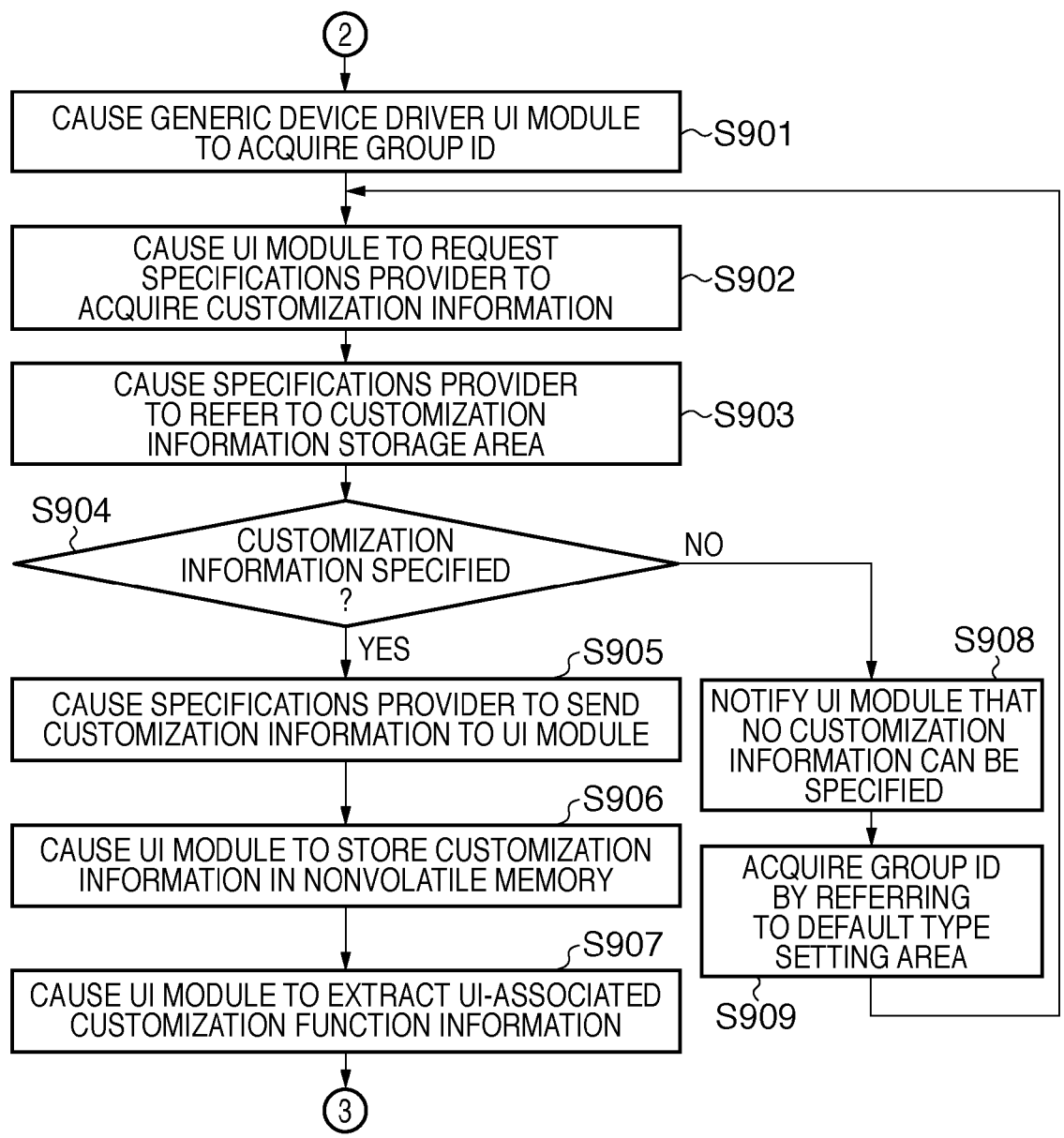
Figures 2, 9A:
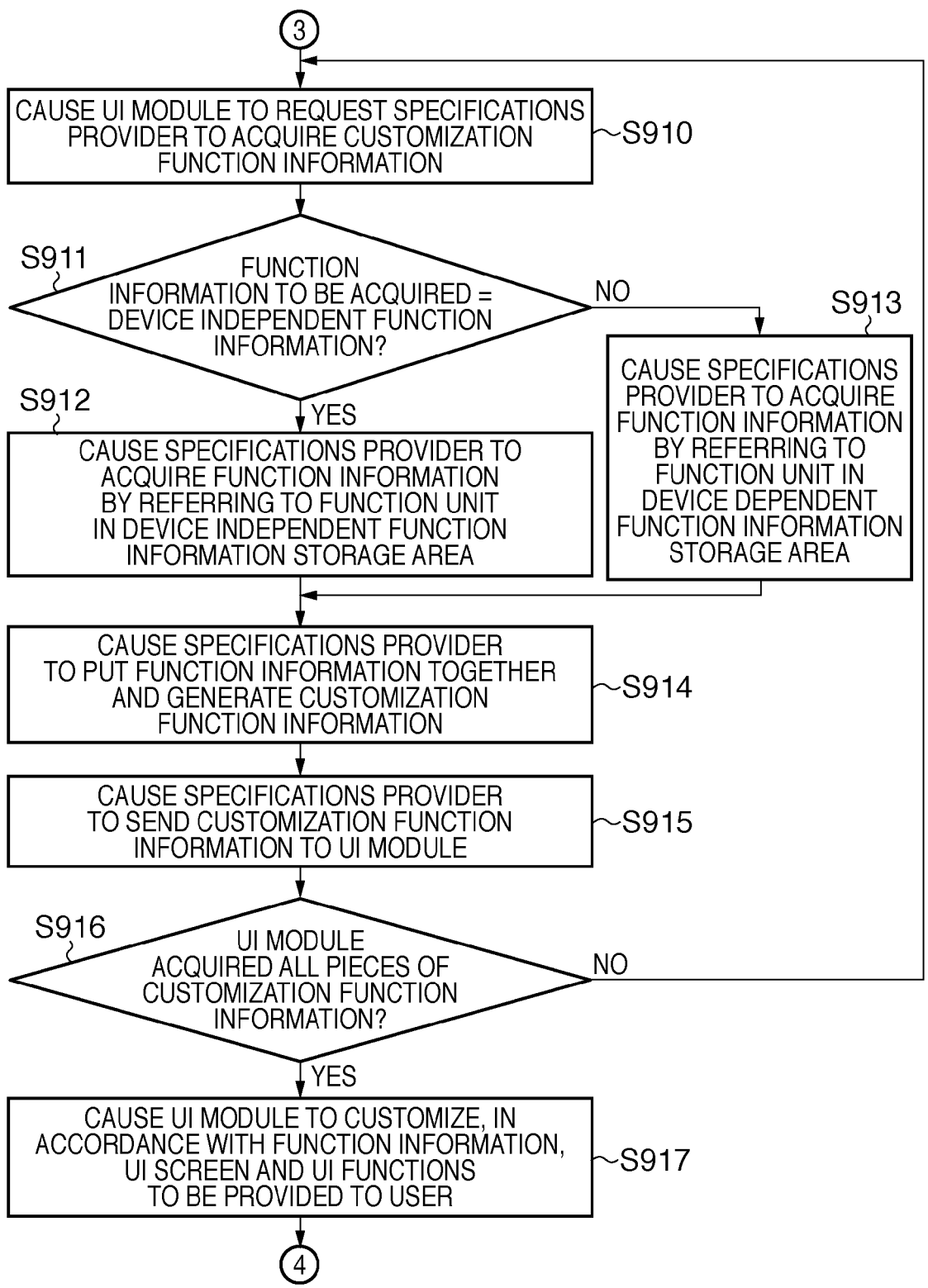
Figures 1, 9B:
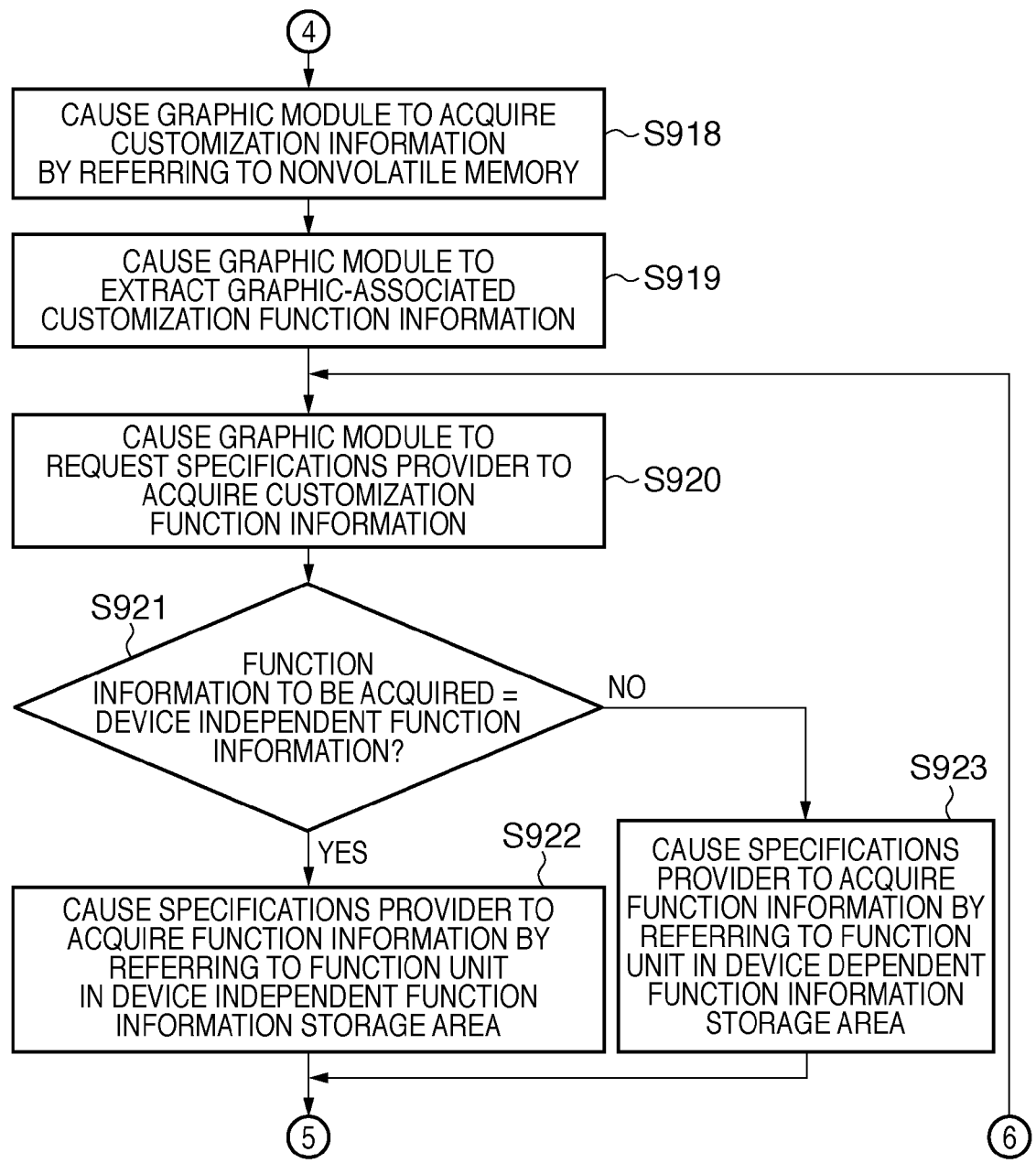
Figures 2, 9B:
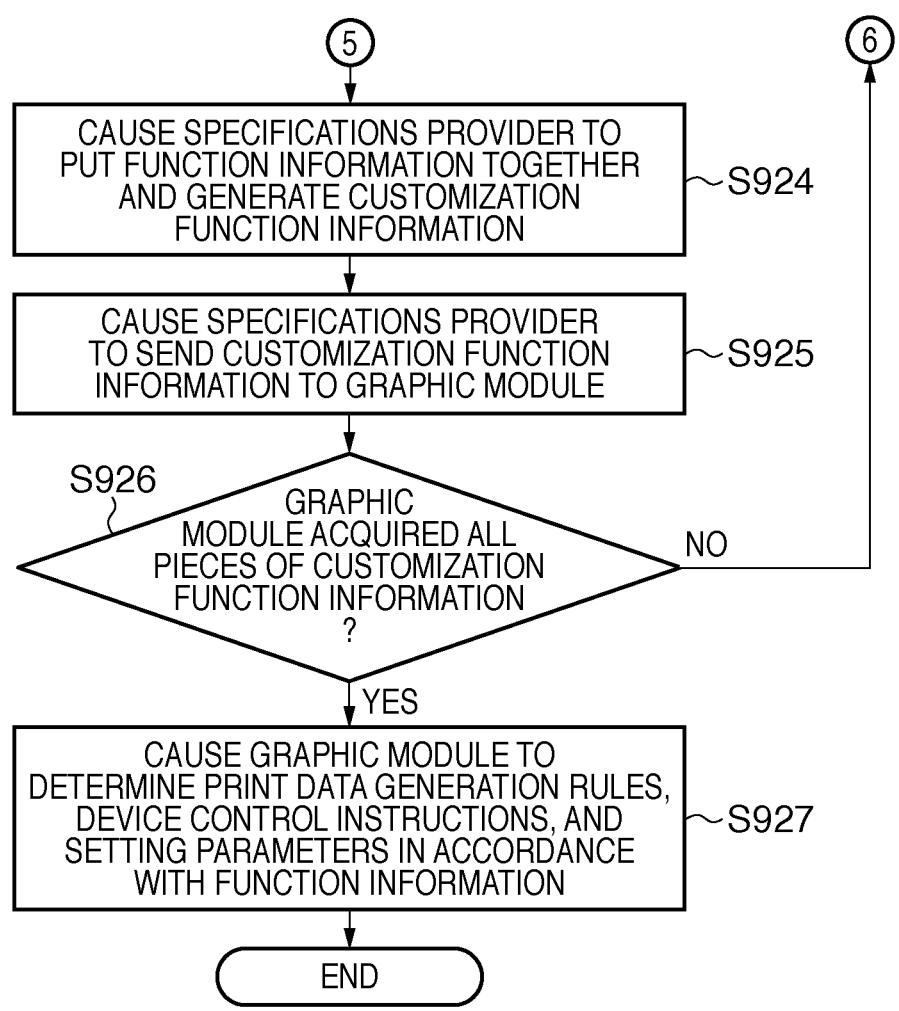

FIGS. 9A-1 and 9A-2 are flowcharts illustrating the processing procedure (following step S816) of the generic device driver installer operating on the client PC.

Figure 8A:
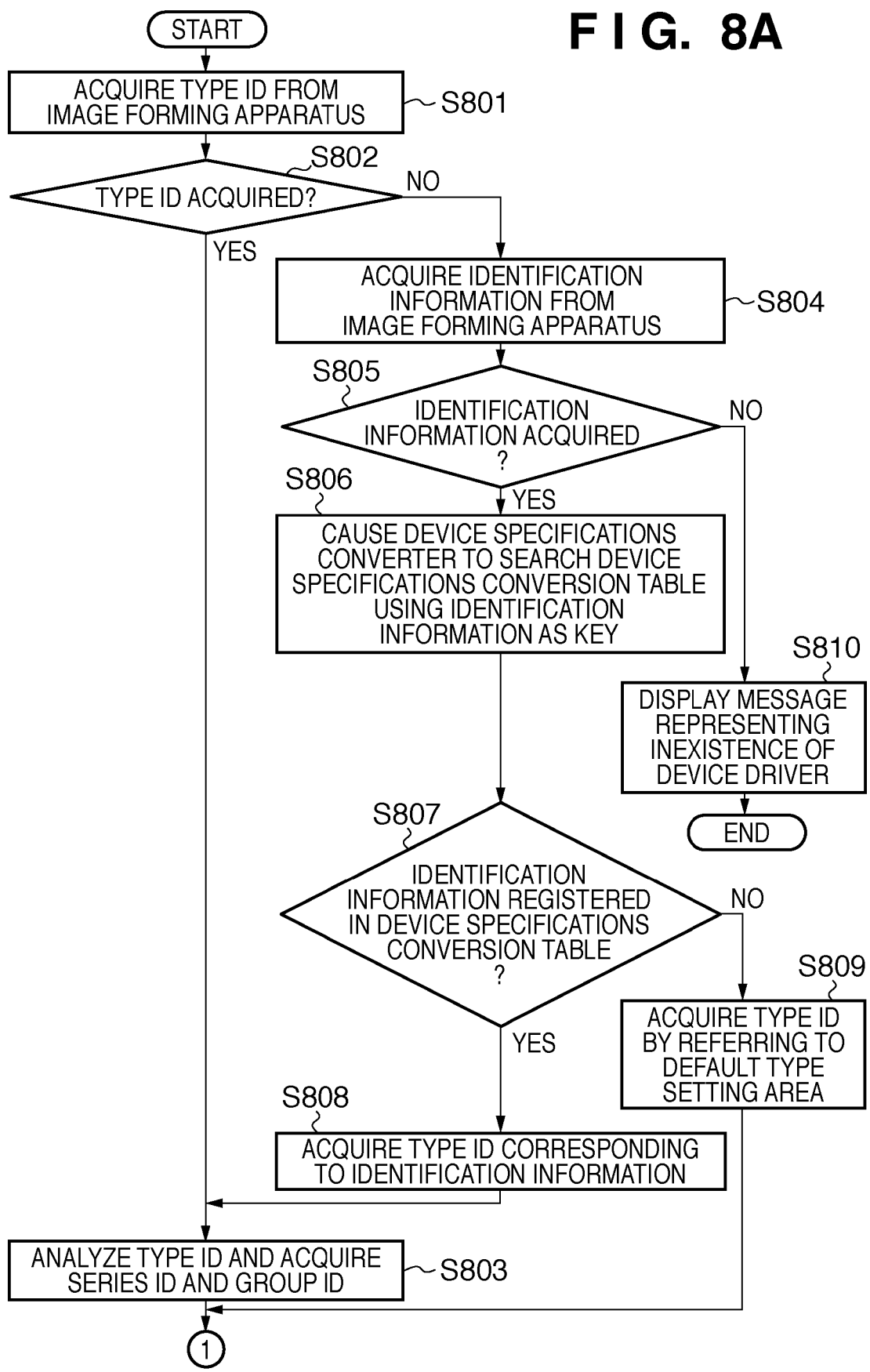
FIGS. 8A and 8B are flowcharts illustrating the processing procedure of the generic device driver installer operating on the client PC.
Figure 8B:
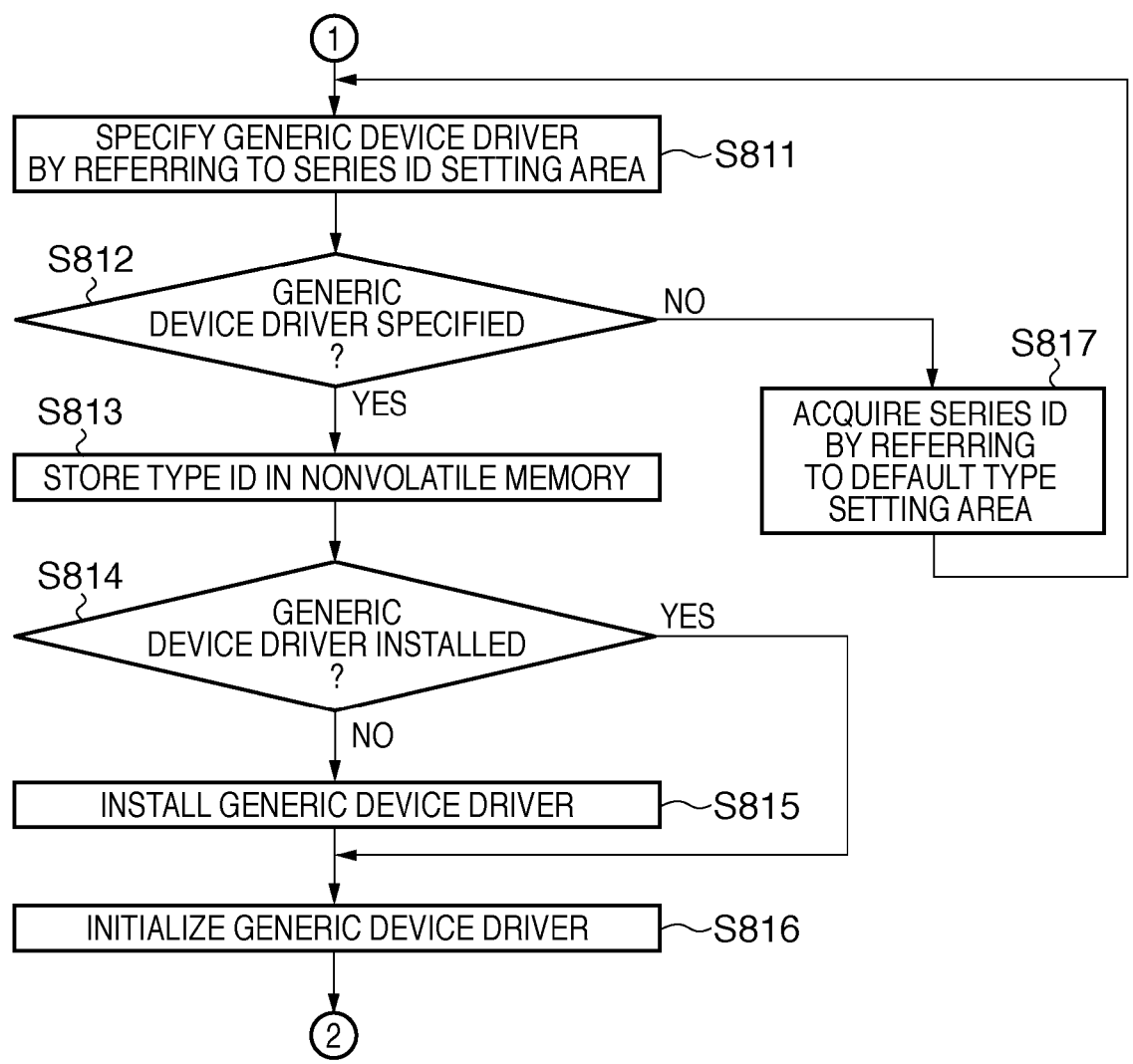

When the generic device driver is initialized in step S816 of FIG. 8B, the process advances to step S901 in FIG. 9A-1. In step S901, the UI module of the generic device driver acquires the group ID by referring to the nonvolatile memory. In step S902, the generic device driver requests the specifications provider 712 of its own to specify customization information using the group ID and notify. In step S903, the specifications provider 712 searches the customization information storage area 713 using the group ID as a key to specify customization information corresponding to the specific group ID.

In step S904, it is determined whether the specifications provider 712 has specified customization information. If no customization information can be specified, the specifications provider 712 notifies, in step S908, the UI module that no customization information can be specified. In step S909, the UI module acquires the default group ID by referring to the default type setting area 504. Then, the process returns to step S902.

In this embodiment, when the control target is, for example, image forming apparatus C, no customization information can be specified in step S904. For this reason, the UI module acquires "C" as the default group ID and returns the process to step S902.

If customization information is specified in step S904, the process advances to step S905. The specifications provider 712 notifies the UI module of the specified customization information. In this embodiment, when the control target is, for example, image forming apparatus A, the specifications provider 712 acquires customization information including pieces of function information "driver UI type: type A", "device control instruction set: type A", "paper selecting function: type A", "paper cassette selecting function: type A", "color/monochrome print function: type A", "resolution selecting function: type A", "finisher selecting function: type A", and "two-way communication function: type A" and notifies the UI module of it.

In step S906, the UI module stores the acquired customization information in the nonvolatile memory. In step S907, the UI module extracts function information necessary for customization from the customization information. In step S910, the UI module notifies the specifications provider 712 of the function information and requests to acquire UI-associated customization function information.

In step S911, the specifications provider 712 determines whether the function information that needs to be acquired is device independent function information. If the function information that needs to be acquired is device independent function information, the process advances to step S912. The specifications provider 712 searches the device independent function information storage area 714 and acquires the function information concerned.

If the function information that needs to be acquired is not device independent function information, the process advances to step S913. The specifications provider 712 searches the device dependent function information storage area 720 and acquires the function information concerned.

In step S914, the specifications provider 712 generates customization function information by putting together the pieces of acquired function information. In step S915, the specifications provider 712 notifies the UI module of the generated customization function information.

In this embodiment, when the control target is, for example, image forming apparatus A, the generic device driver A UI module 702 requests to acquire the function information of "driver unit type: type A" and the function information of "paper cassette selecting function: type A".

The specifications provider 712 searches the device independent function information storage area 714 and acquires "template: UI template 1", "resource language: Japanese", and "Bitmap type: type A" as the function information of "driver unit type: type A".

The specifications provider 712 also searches the device dependent function information storage area 720 and acquires "number of paper cassettes: 4" as the function information of "paper cassette selecting function: type A". The specifications provider 712 puts together the two pieces of acquired function information and sends them to the UI module as customization information.

In step S916, the UI module determines whether all pieces of customization function information have been acquired. If customization function information to acquire still remains, the process returns to step S910. The UI module requests the specifications provider 712 to acquire the next customization function information. In this embodiment, when the control target is image forming apparatus A, the generic device driver A UI module 702 succeedingly requests to acquire the function information of "paper selecting function: type A", the function information of "resolution selecting function: type A", and the function information of "finisher selecting function: type A".

After that, the specifications provider 712 acquires the pieces of function information concerned and puts together and sends them to the UI module as customization information.

If it is determined in step S916 that all pieces of customization function information have been acquired, the process advances to step S917. The UI module of the generic device driver customizes the UI screen and UI functions it will provide to the user in accordance with the acquired customization function information.

In step S918, the graphic module of the generic device driver acquires customization information by referring to the nonvolatile memory. In step S919, the graphic module extracts function information necessary for customization from the customization information.

In step S920, the graphic module notifies the specifications provider 712 of the function information and requests to acquire necessary customization function information.

In step S921, the specifications provider 712 determines whether the function information that needs to be acquired is device independent function information. If the function information that needs to be acquired is device independent function information, the process advances to step S922. The specifications provider 712 searches the device independent function information storage area 714 and acquires the function information concerned.

If the function information that needs to be acquired is not device independent function information, the process advances to step S923. The specifications provider 712 searches the device dependent function information storage area 720 and acquires the function information concerned.

In step S924, the specifications provider 712 generates customization function information by putting together the pieces of acquired function information. In step S925, the specifications provider 712 notifies the graphic module of the generated customization function information.

In this embodiment, when the control target is, for example, image forming apparatus A, the generic device driver A graphic module 703 requests to acquire the function information of "device control instruction set: type A", the function information of "paper cassette selecting function: type A", the function information of "paper selecting function: type A", the function information of "color/monochrome print function: type A", the function information of "resolution selecting function: type A", the function information of "finisher selecting function: type A", and the function information of "two-way communication function: type A".

The specifications provider 712 searches the device dependent function information storage area 720 and acquires, for example, "instruction set: A" and "PDL: LIPS1" as the function information of "device control instruction set: type A", "number of paper cassettes: 4" as the function information of "paper cassette selecting function: type A", "type: plain paper, thick paper, thin paper" and "size: A3, B4, A4, B5, A5, Legal, Letter" as the function information of "paper selecting function: type A", "color print: available" and "monochrome print: available" as the function information of "color/monochrome print function: type A", "600 dpi: available" and "1200 dpi: available" as the function information of "resolution selecting function: type A", "stapling: available" and "case biding: available" as the function information of "finisher selecting function: type A", and "USB I/F communication: possible" and "TCP/IP communication: possible" as the function information of "two-way communication function: type A". These pieces of function information are put together and sent to the graphic module as customization information.

In step S926, the graphic module determines whether all pieces of customization function information have been acquired. If customization function information to acquire still remains, the process returns to step S920. The graphic module requests the specifications provider 712 to acquire the next customization function information.

If it is determined in step S926 that all pieces of customization function information have been acquired, the process advances to step S927. The graphic module of the generic device driver determines print data generation rules, device control instructions to be used to control the image forming apparatus, and the setting parameter instructions of the device control instructions in accordance with the acquired customization function information. More specifically, the generic device driver has, for each image forming apparatus series, functional modules to implement functions providable by image forming apparatuses of a type belonging to the series. The device driver is reconfigured by selecting appropriate functional modules in accordance with the customization information decided by the above-described procedure. The reconfigured device driver is installed in the client computer.

The processing of the generic device driver installer thus ends.

The apparatus arrangement and processing procedure of this embodiment obviate the need for developing and maintaining different device drivers for respective image forming apparatuses and lighten the burden on both the device driver provider and the device driver user.

It is possible to install a device driver optimally customized for an image forming apparatus without making the user conscious of the difference of functions between image forming apparatuses. This improves the usability for the user.

The functions of an image forming apparatus are transferred using a type ID with a small data amount. This makes it possible to acquire information necessary for customization from the image forming apparatus using an information transfer method capable of transferring only a small quantity of data.

It is also possible to install a device driver customized to control image forming apparatuses developed in the past and those to be developed in the future. This improves the usability for the user.

[Second Embodiment]
<Explanation of System>

A facsimile (to be abbreviated as FAX hereinafter) transmission system according to the second embodiment of the present invention will be described next in detail with reference to the accompanying drawings. FIG. 10 is a block diagram showing an example of the arrangement of the FAX transmission system according to the second embodiment of the present invention.

As shown in FIG. 10, apparatuses included in the FAX transmission system of this embodiment are connected via a network 1007. The network 1007 can have either one system or a plurality of systems. Referring to FIG. 10, PCs 1001, 1002, and 1003 are client PCs. The network 1007 connects them. An image forming apparatus 1004 is image forming apparatus U. An image forming apparatus 1005 is image forming apparatus V. An image forming apparatus 1006 is image forming apparatus W. An image forming apparatus according to this embodiment is an MFP having at least a facsimile function or a facsimile apparatus having a single facsimile function. Each image forming apparatus has a function of receiving digital data from a client PC and FAX-transmitting it.

The image forming apparatus U 1004 has the following functions and is designed to be controllable by a device control instruction set of type A.
  Broadcast function of type A: function of setting 50 broadcast destinations at maximum
  Resolution selecting function of type A: function of FAX-transmitting 200-dpi image data and function of FAX-transmitting 400-dpi image data
  Function of performing FAX transmission at designated time
  Two-way communication function of type A: USB I/F two-way communication function and TCP/IP two-way communication function
  Function of communicating with a client PC and notifying it of type ID=AA generated in accordance with the functional arrangement of its own The image forming apparatus V 1005 has the following functions and is designed to be controllable by a device control instruction set of type A.
  Broadcast function of type B: function of setting 10 broadcast destinations at maximum
  Resolution selecting function of type A: function of FAX-transmitting 200-dpi image data and function of FAX-transmitting 400-dpi image data
  Function of performing FAX transmission at designated time
  Two-way communication function of type B: TCP/IP two-way communication function The image forming apparatus W 1006 has the following functions and is designed to be controllable by a device control instruction set of type D.
  Resolution selecting function of type B: function of FAX-transmitting 200-dpi image data
  Two-way communication function of type D
  Function of communicating with a client PC and notifying it of type ID=DD generated in accordance with the functional arrangement of its own The device control instruction set of type D includes a device control instruction set of type C. The two-way communication function of type D includes a two-way communication function of type C.

Figure 11A:
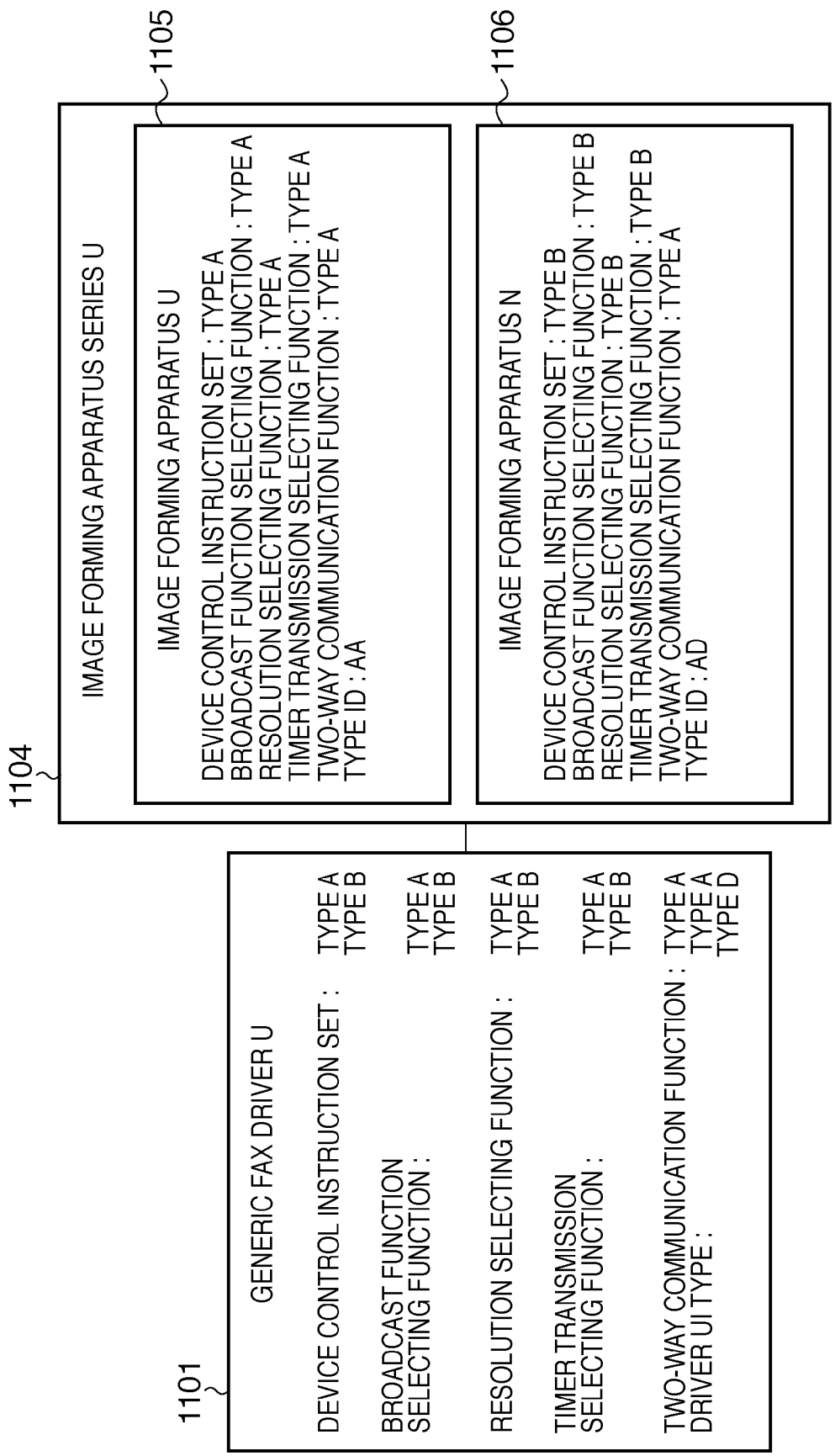
FIG. 11A is a view showing the relationship between a generic FAX driver and image forming apparatuses according to the second embodiment of the present invention.
Figure 11B:
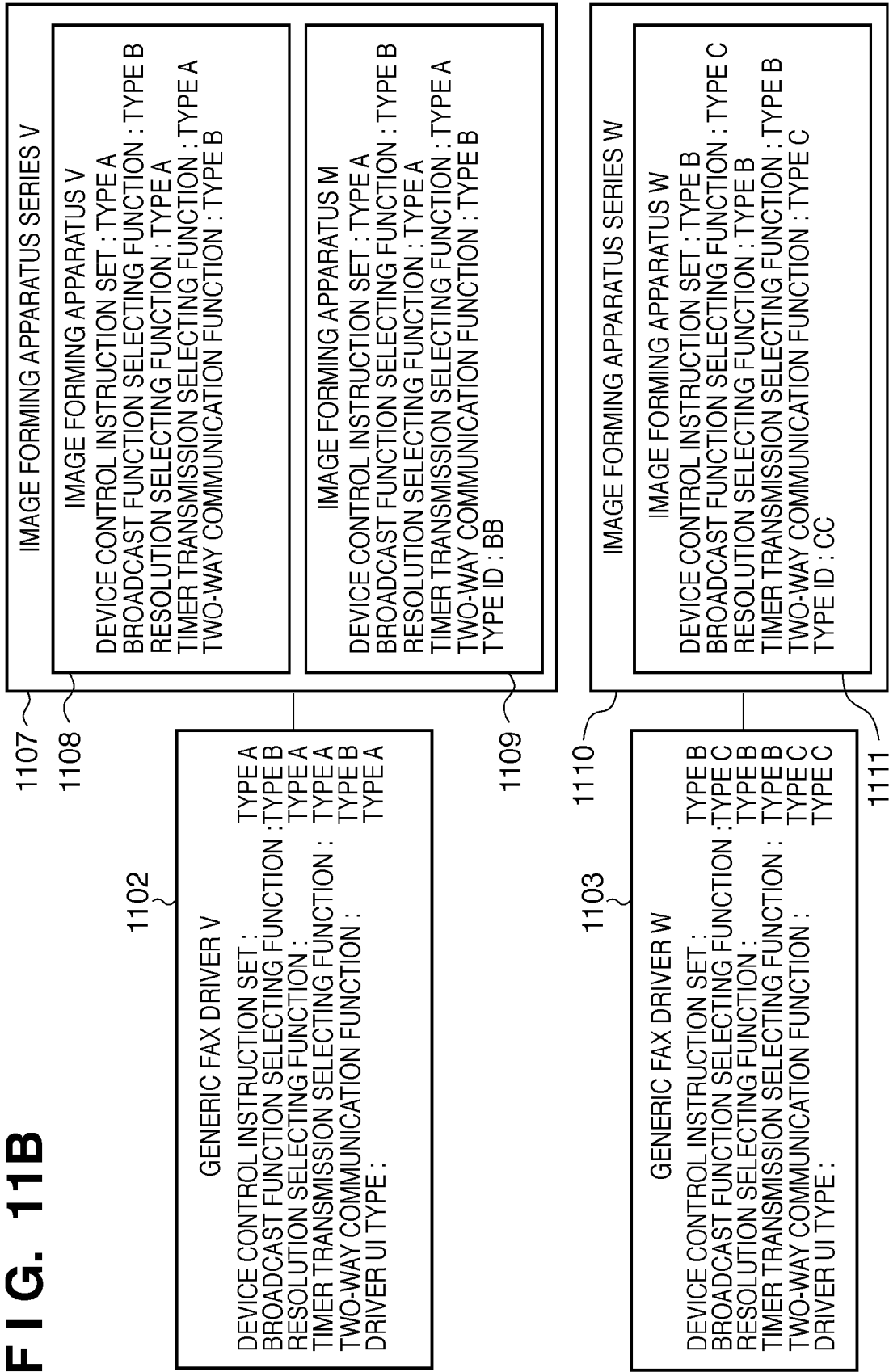
FIG. 11B is a view showing the relationship between generic FAX drivers and image forming apparatuses according to the second embodiment of the present invention.

FIGS. 11A and 11B are views showing the relationship between generic FAX drivers and image forming apparatuses according to the second embodiment of the present invention.

Referring to FIGS. 11A and 11B, an image forming apparatus 1105 is image forming apparatus U. An image forming apparatus 1106 is image forming apparatus N. An image forming apparatus 1108 is image forming apparatus V. An image forming apparatus 1109 is image forming apparatus M. An image forming apparatus 1111 is image forming apparatus W. An image forming apparatus series 1104 is image forming apparatus series U. An image forming apparatus series 1107 is image forming apparatus series V. An image forming apparatus series 1110 belongs to image forming apparatus series W.

As shown in FIGS. 11A and 11B, the image forming apparatus series U 1104 includes the image forming apparatuses U 1105 and N 1106. The image forming apparatus series V 1107 includes the image forming apparatuses V 1108 and M 1109. The image forming apparatus series W 1110 includes the image forming apparatus W 1111.

In FIGS. 11A and 11B, a driver 1101 is generic FAX driver U. A driver 1102 is generic FAX driver V. A driver 1103 is generic FAX driver W. The generic FAX driver U 1101 is a FAX driver for the image forming apparatus series U 1104. The generic FAX driver U 1101 has a function of providing a driver UI screen of type A or D to the user, and a function of controlling an image forming apparatus by transmitting the device control instruction set of type A or B to it.

Similarly, the generic FAX driver V 1102 is a FAX driver for the image forming apparatuses belonging to the image forming apparatus series V 1107. The generic FAX driver V 1102 has a function of providing a driver UI screen of type A to the user, and a function of controlling an image forming apparatus by transmitting the device control instruction set of type A to it.

The generic FAX driver W 1103 is a FAX driver for the image forming apparatus series W 1110. The generic FAX driver W 1103 has a function of providing a driver UI screen of type C to the user, and a function of controlling an image forming apparatus by transmitting the device control instruction set of type B to it.

Each generic FAX driver has various kinds of functions conforming to the functions of a plurality of image forming apparatuses belonging to a corresponding image forming apparatus series, and a function of customizing itself in accordance with the functions of each image forming apparatus.

Figure 12:
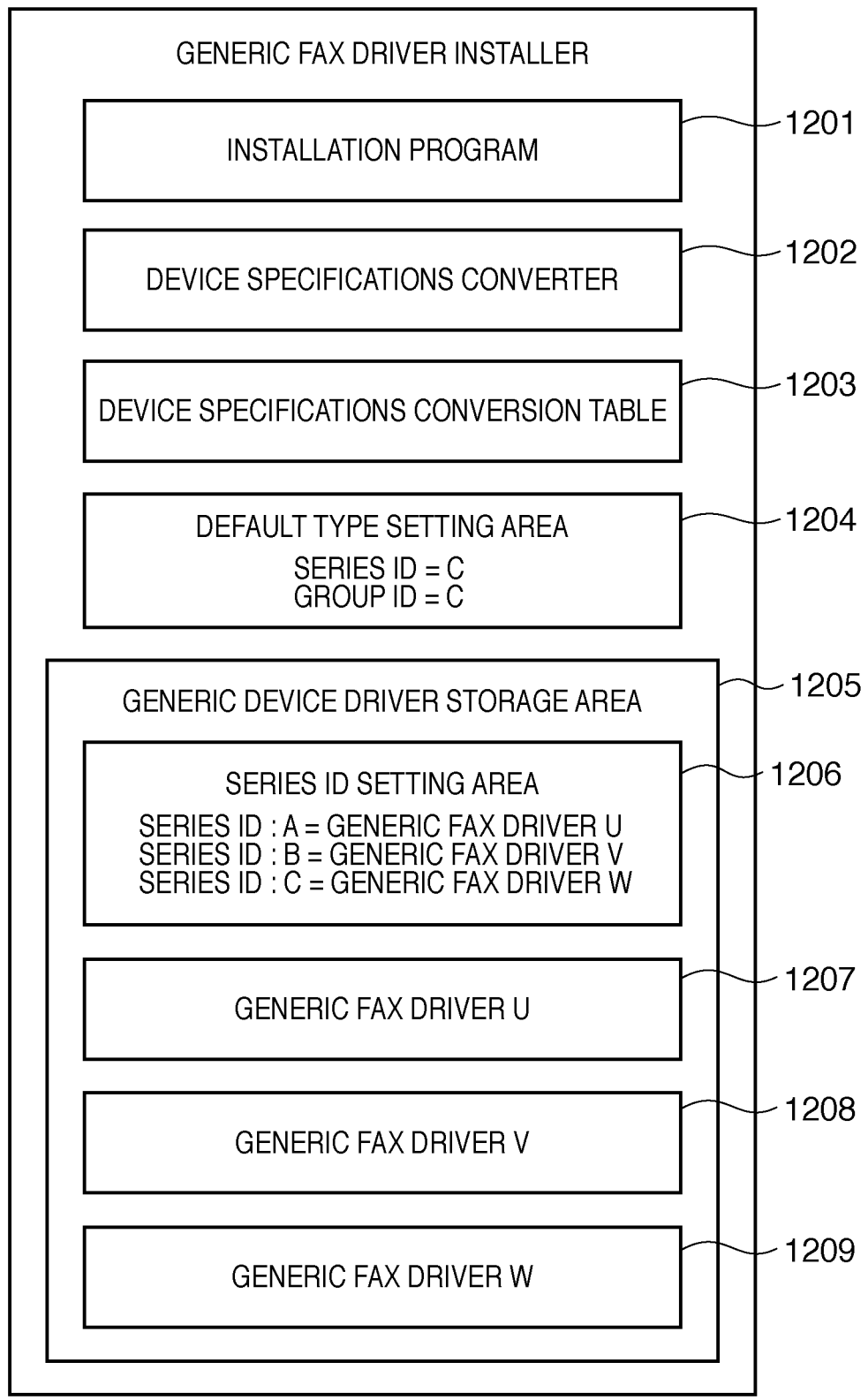
FIG. 12 is a block diagram showing the arrangement of a generic FAX driver installer according to the second embodiment of the present invention.

For example, to control the functions of the image forming apparatuses U 1105 and N 1106, the generic FAX driver U 1101 has the following functions.
  Broadcast functions of types A and B
  Resolution selecting functions of types A and B
  Timer transmission selecting functions of types A and B
  Two-way communication function of type A
  Function of displaying the driver UI screen of type A or D and providing GUI to the user Similarly, to control the functions of the image forming apparatuses V 1108 and M 1109, the generic FAX driver V 1102 has the following functions.
  Broadcast function of type B
  Resolution selecting function of type A
  Timer transmission selecting function of type A
  Two-way communication function of type B
  Function of displaying the driver UI screen of type A and providing GUI to the user To control the functions of the image forming apparatus W 1111, the generic FAX driver W 1103 has the following functions.
  Broadcast function of type C
  Resolution selecting function of type B
  Timer transmission selecting function of type B Two-way communication function of type C
Function of displaying the driver UI screen of type C and providing GUI to the user FIG. 12 is a block diagram showing the arrangement of a generic FAX driver installer according to the second embodiment of the present invention. In this embodiment, the generic FAX driver installer is stored in a hard disk drive (HDD) 208 of the client PC. Referring to FIG. 12, a program 1201 is an installation program. A program 1202 is a device specifications converter. A program 1203 is a device specifications conversion table. A program 1204 is a default type setting area. A program 1205 is a generic device driver storage area.

A series ID storage area 1206 stores, as information that associates a series ID with a generic FAX driver, generic FAX driver U for series ID: A, generic FAX driver V for series ID: B, and generic FAX driver W for series ID: C.

Referring to FIG. 12, reference numeral 1207 denotes generic FAX driver U; 1208, generic FAX driver V; and 1209, generic FAX driver W.

FIG. 13 is a view showing an example of association information stored in the device specifications conversion table according to the second embodiment of the present invention. As shown in FIG. 13, the device specifications conversion table stores "type ID: BB" associated with "identification information: image forming apparatus V".

FIGS. 14A-1, 14A-2 and 14B are views showing details of the generic FAX drivers stored in the generic device driver storage area according to the second embodiment of the present invention. In this embodiment, the generic FAX drivers are packaged together in the generic FAX driver installer and stored in the hard disk drive (HDD) 208 of the client PC.

Referring to FIGS. 14A-1, 14A-2 and 14B, a unit 1401 is a generic FAX driver U dependent portion. A unit 1404 is a generic FAX driver V dependent portion. A unit 1407 is a generic FAX driver W dependent portion. A unit 1410 is a generic FAX driver common portion.

Figures 1, 14A:
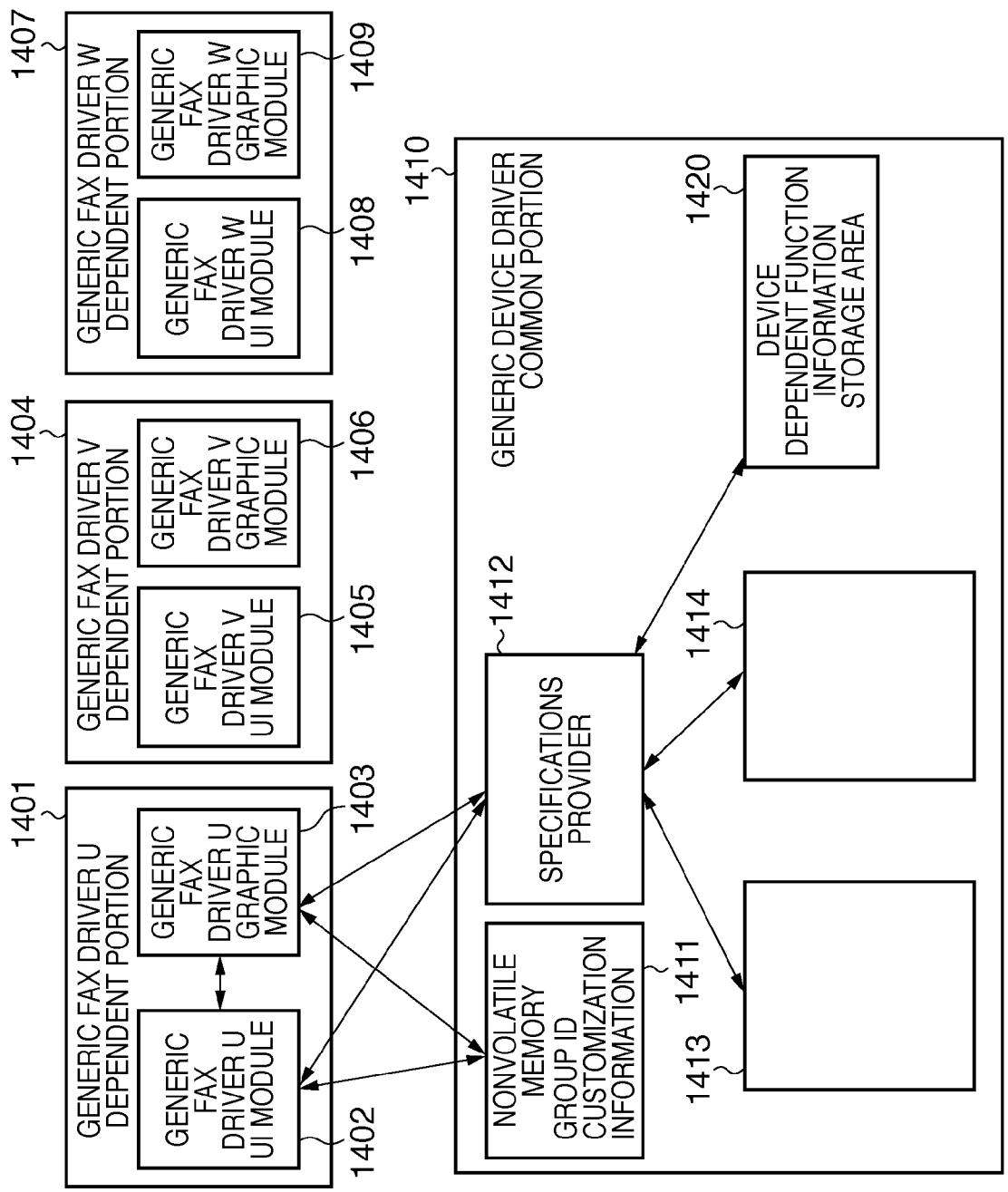

In FIG. 14A, a module 1402 is a generic FAX driver U UI module. A module 1403 is a generic FAX driver U graphic module. A module 1405 is a generic FAX driver V UI module. A module 1406 is a generic FAX driver V graphic module. A module 1408 is a generic FAX driver W UI module. A module 1409 is a generic FAX driver W graphic module.

Referring to FIGS. 14A-1, 14A-2, reference numeral 1411 denotes a nonvolatile memory; 1412, a specifications provider; 1413, a customization information storage area; 1414, a device independent function information storage area; 1415, a driver UI type unit; 1416, type A function information; 1417, type B function information; 1418, type C function information; and 1419, type D function information.

These components are the same as in the first embodiment of the present invention.

Figure 14B:
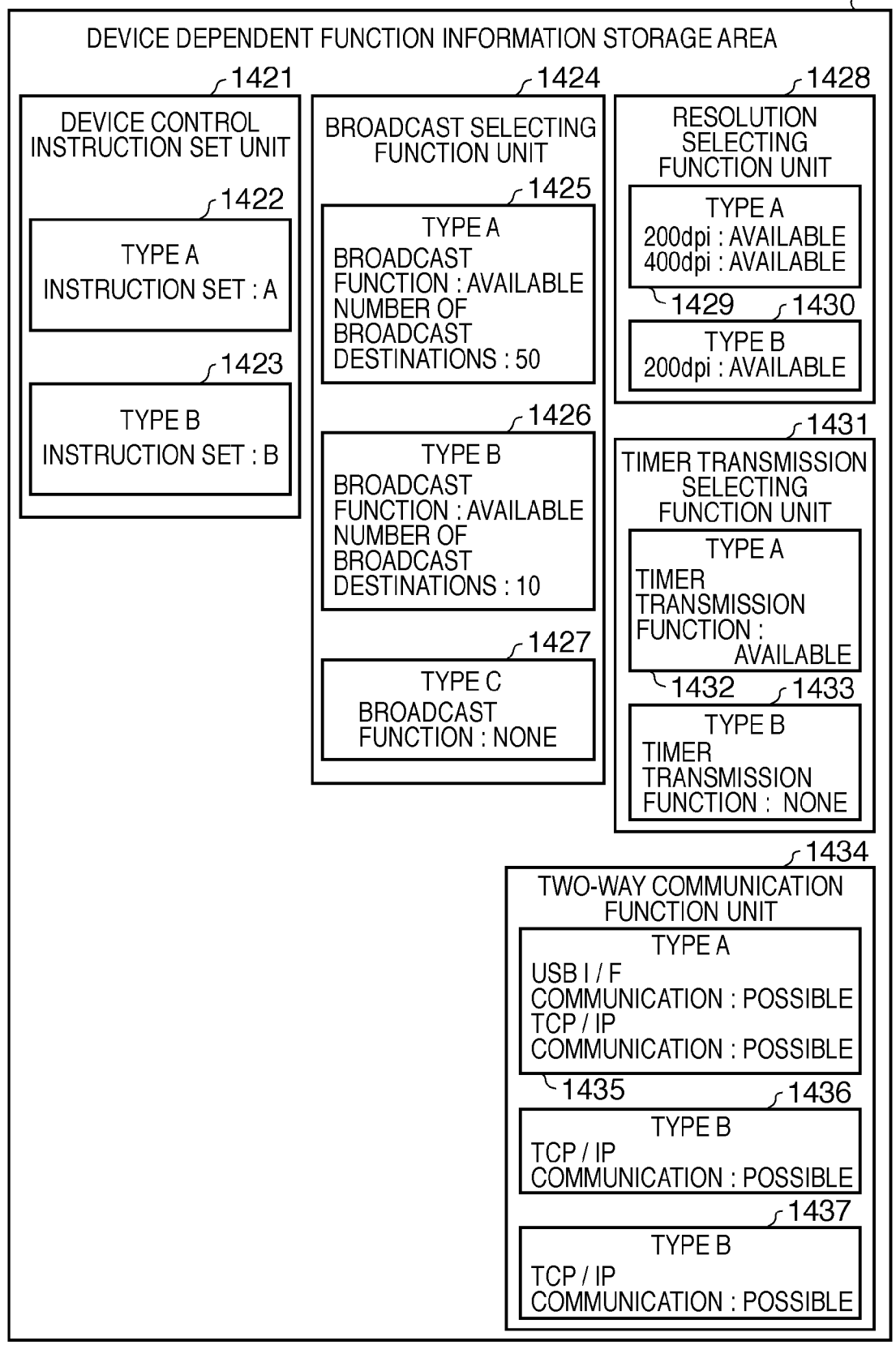
FIG. 14B is a view showing details of the generic FAX drivers stored in the generic device driver storage area according to the second embodiment of the present invention.

In FIGS. 14A-1, 14A-2 and 14B, a device dependent function information storage area 1420 stores device dependent function information. Referring to FIG. 14B, a device control instruction set unit 1421 stores information about the control instructions of the image forming apparatuses usable by the FAX drivers. The device control instruction set unit 1421 includes type A function information 1422 and type B function information 1423. The type A function information 1422 sets "instruction set: A". This information represents that it is necessary to use the instruction set A as a device control instruction.

The type B function information 1423 sets "instruction set: B". This information represents that it is necessary to use the instruction set B as a device control instruction. A broadcast selecting function unit 1424 stores information about the broadcast functions usable by the FAX drivers. The broadcast selecting function unit 1424 includes type A function information 1425, type B function information 1426, and type C function information 1427. The type A function information 1425 sets "broadcast function: available" and "number of broadcast destinations: 50". This information represents that it is possible to set 50 broadcast destinations at maximum per FAX transmission.

The type B function information 1426 sets "broadcast function: available" and "number of broadcast destinations: 10". This information represents that it is possible to set 10 broadcast destinations at maximum per FAX transmission.

The type C function information 1427 sets "broadcast function: not available". This information represents that there is no broadcast function. A resolution selecting function unit 1428 stores information about the resolutions of FAX-transmissible image data. The resolution selecting function unit 1428 includes type A function information 1429 and type B function information 1430. The type A function information 1429 sets "200 dpi: available" and "400 dpi: available". This information represents that it is possible to FAX-transmit 200- or 400-dpi image data.

The type B function information 1430 sets "200 dpi: available". This information represents that it is possible to FAX-transmit 200-dpi image data. A timer transmission selecting function unit 1431 stores information about the function of performing FAX transmission at a time designated by a timer transmission function unit.

The timer transmission selecting function unit 1431 includes type A function information 1432 and type B function information 1433. The type A function information 1432 sets "timer transmission function: available". This information represents that it is possible to issue, to an image forming apparatus, a FAX transmission instruction containing a designated timer transmission time in accordance with a user instruction.

The type B function information 1433 sets "timer transmission function: not available". This information represents that there is no timer transmission function. A two-way communication function unit 1434 stores information about the two-way communication functions usable by the FAX drivers. The two-way communication function unit 1434 includes type A function information 1435, type B function information 1436, and type C function information 1437.

The type A function information 1435 sets "USB I/F communication: possible" and "TCP/IP communication: possible". This information represents that the FAX driver can exchange information with an image forming apparatus by two-way communication using USB I/F and TCP/IP communications.

The type B function information 1436 sets "TCP/IP communication: possible". This information represents that the FAX driver can exchange information with an image forming apparatus by two-way communication using TCP/IP communication.

The type C function information 1437 sets "1394 I/F communication: possible". This information represents that the FAX driver can exchange information with an image forming apparatus by two-way communication using 1394 I/F communication.

<Explanation of Processing of Generic FAX Driver Installer>

The processing procedure of the generic FAX driver installer according to the second embodiment of the present invention is the same as that of the generic device driver installer described in the first embodiment of the present invention, and a description thereof will not be repeated.

As described above, even when the device is not a printer but a facsimile, it is possible to install an appropriate device driver according to the model (type) of the device, as in the first embodiment.

[Other Embodiments]

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-255247, filed Sep. 30, 2008, which is hereby incorporated by reference herein in its entirety.

What is claimed is:

1. An information processing apparatus in which a generic device driver corresponding to a plurality of kinds of image forming apparatuses can be installed, comprising at least a processor, functioning as:
   a type acquisition unit configured to acquire, from an image forming apparatus, a type ID to specify a functional arrangement of the image forming apparatus;
   a specifying unit configured to specify customization information to customize the generic device driver specified based on the type ID for the image forming apparatus; and
   a customization unit configured to customize and install the generic device driver in accordance with the customization information,
   wherein the specifying unit specifies the customization information to customize the generic device driver for the image forming apparatus according to function information for a group related to a plurality of image forming apparatuses corresponding to group information included in the acquired type ID, and
   wherein the customization unit customizes, in accordance with the specified customization information, the generic device driver by selecting at least one function module from a plurality of function modules of the generic driver and reconfiguring the generic device driver.

2. The apparatus according to claim 1, wherein the storage unit stores a plurality of generic device drivers to control the plurality of image forming apparatuses having different functions,
   and wherein said storage unit also stores one or more customization information to customize all the stored generic device drivers.

3. The apparatus according to claim 1, wherein said specifying unit extracts, from the acquired type ID, a series ID defined in accordance with a type of two-way communication of the image forming apparatus, and specifies the generic device driver based on the series ID.

4. The apparatus according to claim 1, wherein
   the customization information includes a function dependent on the functions of the image forming apparatus and a function independent of the functions of the image forming apparatus, and
   said customization unit customizes the generic device driver for each function.

5. The apparatus according to claim 1, further comprising a unit configured to manage the function information and to generate and provide the customization information of the generic device driver, wherein the function information is classified depending on the functions of the image forming apparatus.

6. The apparatus according to claim 1, further comprising a unit configured to specify, install and customize the generic device driver in accordance with a type ID designated in advance when said type acquisition unit has acquired no type ID from the image forming apparatus or when no generic device driver has been specified based on the type ID acquired from the image forming apparatus.

7. The apparatus according to claim 1, wherein
   the image forming apparatus has at least one of a printer function of performing printing based on print data transmitted from a host apparatus and a facsimile function of transmitting an image based on image data transmitted from the host apparatus, and wherein the generic device driver controls the function.

8. A device driver installation method in an information processing apparatus in which a generic device driver corresponding to a plurality of kinds of image forming apparatuses can be installed, the method comprising the steps of:
   acquiring, from an image forming apparatus, a type ID to specify a functional arrangement of the image forming apparatus;
   specifying customization information to customize the generic device driver specified based on the type ID for the image forming apparatus; and
   customizing and installing the generic device driver in accordance with the customization information,
   wherein the specifying step specifies the customization information to customize the generic device driver for the image forming apparatus according to function information for a group related to a plurality of image forming apparatuses corresponding to group information included in the acquired type ID, and
   wherein the customization step customizes, in accordance with the specified customization information, the generic device driver by selecting at least one function module from the plurality of function modules of the generic driver and reconfiguring the generic device driver.

9. A non-transitory computer-readable recording medium storing therein a program which causes a computer to perform a method according to claim 8.

* * * * *